(12) United States Patent
Ishihara et al.

(10) Patent No.: US 12,196,164 B2
(45) Date of Patent: Jan. 14, 2025

(54) HIGH-PRESSURE PUMP

(71) Applicant: DENSO CORPORATION, Kariya (JP)

(72) Inventors: Takayuki Ishihara, Kariya (JP); Tatsurou Koga, Kariya (JP); Yasuhiro Sawada, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 18/069,642

(22) Filed: Dec. 21, 2022

(65) Prior Publication Data

US 2023/0124370 A1 Apr. 20, 2023

Related U.S. Application Data

(63) Continuation of application No. PCT/JP2021/023194, filed on Jun. 18, 2021.

(30) Foreign Application Priority Data

Jun. 30, 2020 (JP) .................................. 2020-113263
Mar. 8, 2021 (JP) .................................. 2021-036089

(51) Int. Cl.
*F02M 59/46* (2006.01)
*F02M 59/02* (2006.01)
(Continued)

(52) U.S. Cl.
CPC .......... *F02M 59/466* (2013.01); *F02M 59/02* (2013.01); *F02M 59/102* (2013.01);
(Continued)

(58) Field of Classification Search
CPC ...... F02M 59/46; F02M 59/102; F02M 59/44; F02M 59/368; F02M 59/462;
(Continued)

(56) References Cited

U.S. PATENT DOCUMENTS 6,626,151 B2 * 9/2003 Boehm .................. F02M 59/34
251/129.02
6,631,706 B1 10/2003 Yamada et al.
(Continued)

FOREIGN PATENT DOCUMENTS

DE 10 2016 213 343 1/2018
DE 10 2017 211 361 1/2019
(Continued)

*Primary Examiner* — Peter J Bertheaud
(74) *Attorney, Agent, or Firm* — Nixon & Vanderhye P.C.

(57) ABSTRACT

A high-pressure pump includes a valve member that allows or blocks a flow of fuel to a pressure chamber. A needle is reciprocable inside a cylinder member. One end of the needle facing the pressure chamber is provided with the valve member. Another end of the needle is provided with a movable core that faces a fixed core in an axial direction of the needle. The high-pressure pump includes a coil assembly that includes a coil, a terminal connected to the coil, and first and second yokes that form a magnetic circuit on both sides of the coil in the axial direction. The coil assembly is between a first connection portion and a second connection portion. The first connection portion connects the coil assembly and the fixed core. The second connection portion connects the coil assembly and the cylinder member.

6 Claims, 19 Drawing Sheets

(51) Int. Cl.
    *F02M 59/10*   (2006.01)
    *F02M 59/36*   (2006.01)
    *F02M 59/44*   (2006.01)
    *F02M 59/48*   (2006.01)
    *F04B 1/0452*  (2020.01)
    *F04B 7/00*    (2006.01)
    *F04B 19/22*   (2006.01)
    *F04B 49/22*   (2006.01)
    *F04B 53/10*   (2006.01)
    *F04B 53/16*   (2006.01)
    *F16K 31/06*   (2006.01)

(52) U.S. Cl.
    CPC ........ *F02M 59/366* (2013.01); *F02M 59/368* (2013.01); *F02M 59/44* (2013.01); *F02M 59/46* (2013.01); *F02M 59/462* (2013.01); *F02M 59/48* (2013.01); *F04B 1/0452* (2013.01); *F04B 7/0076* (2013.01); *F04B 19/22* (2013.01); *F04B 49/22* (2013.01); *F04B 53/10* (2013.01); *F04B 53/1087* (2013.01); *F04B 53/16* (2013.01); *F16K 31/0675* (2013.01)

(58) Field of Classification Search
    CPC .... F02M 59/366; F02M 59/02; F02M 59/466; F02M 59/48; F02M 2200/8038; F02M 59/445; F04B 53/16; F04B 7/0076; F04B 19/22; F04B 53/10; F04B 53/1087; F04B 1/0452; F04B 49/22; F16K 31/0675
    See application file for complete search history.

(56) References Cited

U.S. PATENT DOCUMENTS

| | | | |
|---|---|---|---|
| 10,527,017 B2 * | 1/2020 | Koga | ........... F02M 59/025 |
| 2004/0055580 A1 | 3/2004 | Yamada et al. | |
| 2009/0178652 A1 | 7/2009 | Yamada et al. | |
| 2012/0247591 A1 | 10/2012 | Kuroyanagi et al. | |
| 2016/0115953 A1 | 4/2016 | Kuroyanagi et al. | |
| 2020/0248663 A1 | 8/2020 | Tokuo et al. | |

FOREIGN PATENT DOCUMENTS

| | | |
|---|---|---|
| JP | 2013-144973 | 7/2013 |
| JP | 2016-217329 | 12/2016 |

* cited by examiner

AXIAL DIRECTION OF COIL

TOWARD PRESSURE CHAMBER

TOWARD PRESSURE CHAMBER →

AXIAL DIRECTION OF COIL

TOWARD PRESSURE CHAMBER →

AXIAL DIRECTION OF COIL

TOWARD PRESSURE CHAMBER →

AXIAL DIRECTION OF COIL

AXIAL DIRECTION OF COIL

TOWARD PRESSURE CHAMBER

AXIAL DIRECTION OF COIL

TOWARD PRESSURE CHAMBER

AXIAL DIRECTION OF COIL

TOWARD PRESSURE CHAMBER

HIGH-PRESSURE PUMP

CROSS REFERENCE TO RELATED APPLICATIONS

The present application is a continuation application of International Patent Application No. PCT/JP2021/023194 filed on Jun. 18, 2021, which designated the U.S. and claims the benefit of priority from Japanese Patent Applications No. 2020-113263 filed on Jun. 30, 2020 and No. 2021-036089 filed on Mar. 8, 2021. The entire disclosures of all of the above applications are incorporated herein by reference.

TECHNICAL FIELD

The present disclosure relates to a high-pressure pump.

BACKGROUND

A high-pressure pump pressurizes fuel and supplies the pressurized fuel to an internal combustion engine.

SUMMARY

According to at least one embodiment of the present disclosure, a high-pressure pump includes a pressure chamber forming portion, an intake passage forming portion, a seat member, a valve member, a cylinder member, a needle, a movable core, a fixed core, a coil assembly, a first connection portion and a second connection portion. The pressure chamber forming portion has a pressure chamber in which fuel is pressurized. The intake passage forming portion has an intake passage through which the fuel flows to be sucked into the pressure chamber. The seat member is arranged in the intake passage and includes a communication passage through which one surface and another surface of the seat member communicate with each other. The valve member is provided between the seat member and the pressure chamber, and allows or blocks a flow of the fuel through the communication passage by the valve member being separated from the seat member in a valve open state or being in contact with the seat member in a valve closed state. The cylinder member is arranged such that the seat member is between the cylinder member and the pressure chamber. The needle is reciprocable in an axial direction of the cylinder member inside the cylinder member. The needle has one end movable together with the valve member. The movable core is provided at another end of the needle. The fixed core faces the movable core in an axial direction of the needle. The coil assembly includes a coil sub-assembly, a first yoke and a second yoke. The coil sub-assembly includes a connector, a terminal provided in the connector, a coil having a cylindrical shape and connected to the terminal, and a resin portion covering the terminal and the coil. The first yoke is arranged between the coil and the pressure chamber in an axial direction of the coil, and the first yoke forms a magnetic circuit by energization of the coil. The second yoke is arranged such that the coil is between the second yoke and the pressure chamber in the axial direction of the coil, and the second yoke forms a magnetic circuit by energization of the coil. The first connection portion is arranged such that the coil assembly is between the first connection portion and the pressure chamber. The first connection portion connects the coil assembly and the fixed core. The second connection portion is arranged between the coil assembly and the pressure chamber. The second connection portion connects the coil assembly and the cylinder member.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
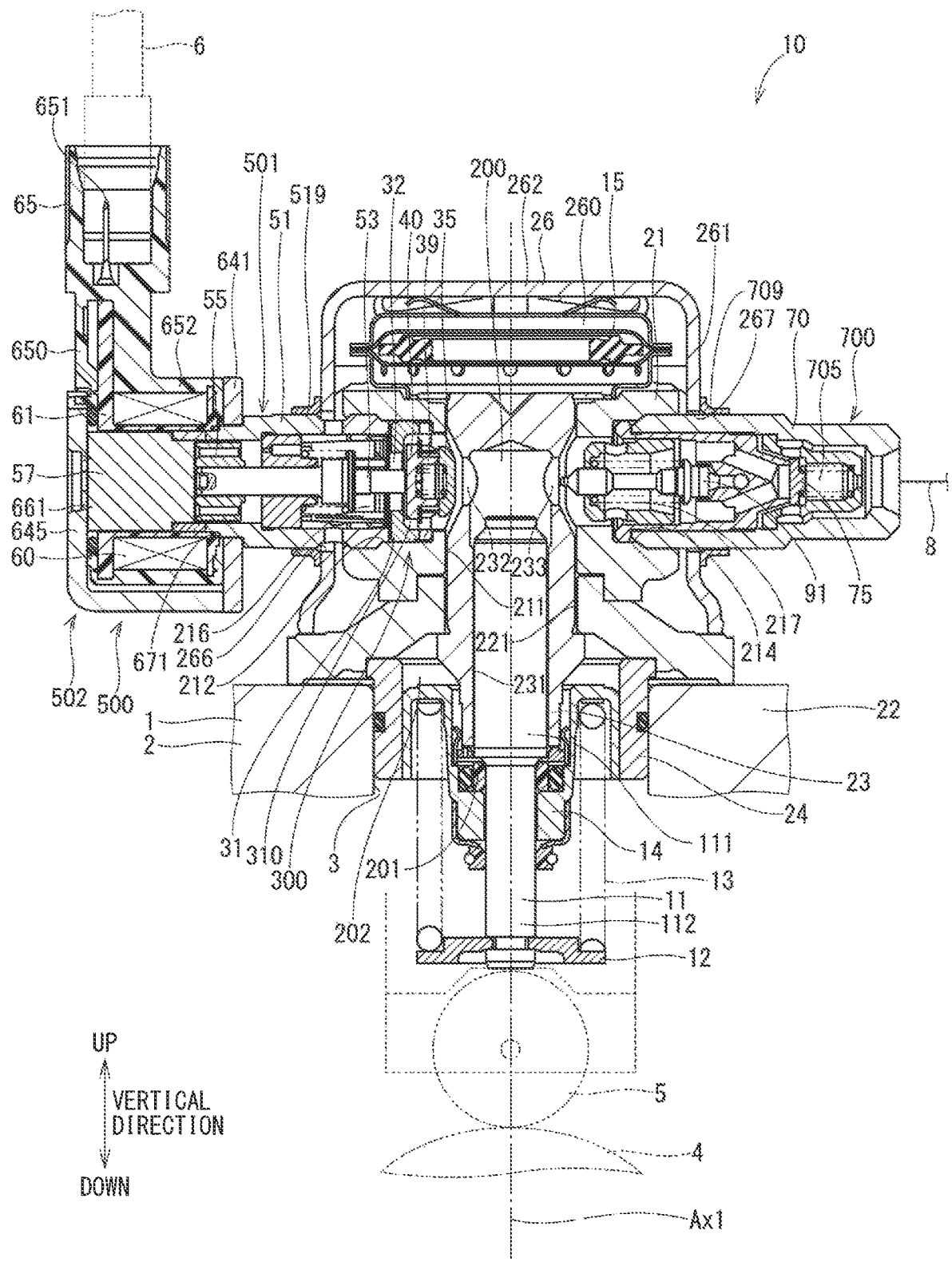
FIG. 1 is a cross-sectional view showing a high-pressure pump according to a first embodiment.

To begin with, examples of relevant techniques will be described. According to a comparative example, a high-pressure pump includes a coil assembly including a coil to open and close an intake valve that adjusts fuel to be sucked into a pressure chamber. The coil assembly is connected to a housing of the high-pressure pump via a cylinder member.

In the high-pressure pump of the comparative example, a yoke of the coil assembly and a fixed core are fixed by welding at an end of the coil assembly facing away from the pressure chamber. On the other hand, at least a gap is formed at a circumferential boundary between an inner peripheral wall of the yoke of the coil assembly and an outer peripheral wall of the cylinder member at an end of the coil assembly facing the pressure chamber. That is, the coil assembly is provided by loose fitting with respect to the cylinder member.

In the high-pressure pump of the comparative example, the coil assembly includes a terminal for energizing the coil. When the high-pressure pump is attached to an internal combustion engine, a portion of the loosely fitted coil assembly at the end facing the pressure chamber may particularly vibrate due to vibration of the internal combustion engine and vibration of the high-pressure pump during operation.

When the coil assembly vibrates, the terminal may vibrate and wear, resulting in poor continuity. As a result, an intake valve portion may have operation malfunction, resulting in unstable discharge of fuel in the high-pressure pump.

In contrast to the comparative example, according to a high-pressure pump of the present disclosure, fuel can be discharged stably.

According to at least one embodiment of the present disclosure, a high-pressure pump includes a pressure chamber forming portion, an intake passage forming portion, a seat member, a valve member, a cylinder member, a needle, a movable core, a fixed core, a coil assembly, a first connection portion and a second connection portion.

The pressure chamber forming portion has a pressure chamber in which fuel is pressurized. The intake passage forming portion has an intake passage through which the fuel flows to be sucked into the pressure chamber. The seat member is arranged in the intake passage and includes a communication passage through which one surface and another surface of the seat member communicate with each other.

The valve member is provided between the seat member and the pressure chamber, and allows or blocks a flow of the fuel through the communication passage by the valve member being separated from the seat member in a valve open state or being in contact with the seat member in a valve closed state. The cylinder member is arranged such that the seat member is between the cylinder member and the pressure chamber.

The needle is reciprocable in an axial direction of the cylinder member inside the cylinder member. The needle has one end movable together with the valve member. The movable core is provided at another end of the needle. The fixed core faces the movable core in an axial direction of the needle.

The coil assembly includes a coil sub-assembly, a first yoke and a second yoke. The coil sub-assembly includes a connector, a terminal provided in the connector, a coil having a cylindrical shape and connected to the terminal, and a resin portion covering the terminal and the coil.

The first yoke is arranged between the coil and the pressure chamber in an axial direction of the coil, and the first yoke forms a magnetic circuit by energization of the coil. The second yoke is arranged such that the coil is between the second yoke and the pressure chamber in the axial direction of the coil, and the second yoke forms a magnetic circuit by energization of the coil.

The first connection portion is arranged such that the coil assembly is between the first connection portion and the pressure chamber. The first connection portion connects the coil assembly and the fixed core. The second connection portion is arranged between the coil assembly and the pressure chamber. The second connection portion connects the coil assembly and the cylinder member.

In the present disclosure, an end of the coil assembly facing away from the pressure chamber is supported by the fixed core via the first connection portion, and another end of the coil assembly facing the pressure chamber is supported by the cylinder member via the second connection portion. That is, both ends of the coil assembly in the axial direction are supported.

Therefore, when the high-pressure pump is attached to an internal combustion engine, vibration of the coil assembly due to vibration of the internal combustion engine and vibration of the high-pressure pump during operation can be reduced. Accordingly, vibration and wear of the terminal can be reduced, and poor continuity can be reduced. As a result, the operation malfunction of an intake valve portion can be reduced, and fuel discharge in the high-pressure pump can be stabilized.

Hereinafter, multiple embodiments for implementing the present disclosure will be described referring to drawings. Among the embodiments, parts that correspond to each other may be assigned the same reference numeral, and redundant explanation for the part may be omitted. When only a part of a configuration is described in an embodiment, explanations of the other parts of the configuration described in another preceding embodiment may be used. Parts may be combined among the embodiments even if it is not explicitly described that the parts can be combined. The embodiments may be partially combined even if it is not explicitly described that the embodiments can be combined, provided there is no harm in the combination.

First Embodiment

FIG. 1 shows a high-pressure pump according to a first embodiment.

A high-pressure pump 10 according to the present embodiment is applicable to a fuel supply system including a fuel injection valve that supplies fuel to an internal combustion engine (hereinafter, referred to as "engine") 1 of a vehicle (not shown). The high-pressure pump 10 is attached to, for example, an engine head 2 of the engine 1.

Gasoline or the like as fuel is stored in a fuel tank mounted on the vehicle. A fuel pump pumps up and discharges the fuel in the fuel tank. A fuel supply pipe connects the fuel pump and the high-pressure pump 10. Accordingly, the fuel pumped up and discharged by the fuel pump flows into the high-pressure pump 10 through the fuel supply pipe.

The engine 1 is provided with a fuel rail together with the high-pressure pump 10. The engine 1 is, for example, a four-cylinder gasoline engine. The fuel rail is provided on the engine head 2 of the engine 1. The fuel injection valve is provided such that a nozzle hole is exposed inside a combustion chamber of the engine 1. For example, four fuel injection valves are provided according to the number of cylinders in the engine 1. The four fuel injection valves are connected to the fuel rail.

The high-pressure pump 10 and the fuel rail are connected by a high-pressure fuel pipe 8. The fuel that has flowed into the high-pressure pump 10 from the fuel supply pipe is pressurized by the high-pressure pump 10 and supplied to the fuel rail through the high-pressure fuel pipe 8. Accordingly, the fuel in the fuel rail is kept at a relatively high pressure. The fuel injection valve is opened or closed according to a command from an ECU as a control device (not shown), and injects the fuel in the fuel rail into the combustion chamber of the engine 1. As described above, the fuel injection valve is a so-called direct injection type (DI) fuel injection valve.

A sensor is provided on a fuel tank side of the fuel supply pipe with respect to the high-pressure pump 10. The sensor can detect a pressure of the fuel in the fuel supply pipe, i.e., a fuel pressure, and a temperature of the fuel, i.e., a fuel temperature, and send corresponding signals to the ECU. The ECU determines a target pressure of the fuel to be discharged from the fuel pump based on the fuel pressure and the fuel temperature in the fuel supply pipe detected by the sensor, and controls operation of a motor of the fuel pump such that the fuel at the target pressure is discharged from the fuel pump.

As shown in FIG. 1, the high-pressure pump 10 includes an upper housing 21, a lower housing 22, a cylinder 23, a holder support portion 24, a cover 26, a plunger 11, an intake valve portion 300, an electromagnetic drive portion 500, and a discharge passage portion 700.

The upper housing 21, the lower housing 22, the cylinder 23, and the holder support portion 24 are each formed of a metal such as stainless steel. Here, the upper housing 21 and the lower housing 22 correspond to a "housing".

The upper housing 21 is formed, for example, in a substantially octagonal columnar shape. The upper housing 21 has an octagonal cylindrical housing outer peripheral wall.

The upper housing 21 includes a hole portion 211, an intake hole portion 212, and a discharge hole portion 214. The hole portion 211 is formed to penetrate a center of the upper housing 21 in a cylindrical shape along an axis of the upper housing 21.

The intake hole portion 212 is formed to extend from the housing outer peripheral wall of the upper housing 21 toward the hole portion 211 and to be connected to the hole portion 211. An intake passage 216 is formed inside the intake hole portion 212 of the upper housing 21. Here, the upper housing 21 corresponds to an "intake passage forming portion".

The discharge hole portion 214 is formed to extend toward the hole portion 211 from a side of the housing outer peripheral wall of the upper housing 21 opposite to the intake hole portion 212 and to be connected to the hole portion 211. A discharge passage 217 is formed inside the discharge hole portion 214. Here, the discharge hole portion 214 of the upper housing 21 corresponds to a "discharge passage forming portion".

The lower housing 22 is formed in a substantially disk shape. The lower housing 22 includes a hole portion 221.

The hole portion 221 is formed to penetrate a center of the lower housing 22 in a substantially cylindrical shape in a plate thickness direction.

The lower housing 22 is provided integrally with the upper housing 21 so as to be fitted into a recess portion formed below the upper housing 21.

When the high-pressure pump 10 is attached to the engine 1, the lower housing 22 is fixed to the engine head 2 of the engine 1 by bolts (not shown).

The cylinder 23 includes a cylinder hole portion 231. The cylinder hole portion 231 is formed in a substantially cylindrical shape so as to extend from one end surface toward the other end surface of a columnar member. That is, the cylinder 23 is formed in a bottomed cylindrical shape having a cylinder portion and a bottom portion that closes one end of the cylinder portion.

An outer diameter of the cylinder 23 is slightly larger than an inner diameter of the hole portion 211 of the upper housing 21. The cylinder 23 passes through the hole portion 221 of the lower housing 22 and is provided integrally with the upper housing 21 and the lower housing 22 such that an outer peripheral wall on a bottom portion side is fitted into the hole portion 211 of the upper housing 21. The cylinder 23 includes an intake hole 232 and a discharge hole 233. The intake hole 232 is formed to connect an end portion of the cylinder hole portion 231 on a bottom portion side and the intake hole portion 212 of the upper housing 21. The discharge hole 233 is formed to connect the end portion of the cylinder hole portion 231 on the bottom portion side and the discharge hole portion 214 of the upper housing 21.

The holder support portion 24 is formed in a substantially cylindrical shape. The holder support portion 24 is provided integrally with the lower housing 22 such that one end of the holder support portion 24 is fitted into a recess portion formed below the lower housing 22. When the high-pressure pump 10 is attached to the engine 1, the holder support portion 24 is inserted into an attachment hole portion 3 formed in the engine head 2 (see FIG. 1).

The plunger 11 is formed of a metal such as stainless steel in a substantially columnar shape. The plunger 11 includes a large diameter portion 111 and a small diameter portion 112. An outer diameter of the small diameter portion 112 is smaller than an outer diameter of the large diameter portion 111. The plunger 11 is provided such that a large diameter portion 111 side is inserted into the cylinder hole portion 231 of the cylinder 23. A pressure chamber 200 is provided between a bottom wall and an inner peripheral wall of the cylinder hole portion 231 and an end portion of the plunger 11 on the large diameter portion 111 side. That is, the cylinder 23 forms the pressure chamber 200. Here, the cylinder 23 corresponds to a "pressure chamber forming portion". The pressure chamber 200 is connected to the intake hole 232 and the discharge hole 233.

An outer diameter of the plunger 11 is formed to be slightly smaller than an inner diameter of the cylinder 23, that is, an inner diameter of the cylinder hole portion 231. Therefore, the plunger 11 can axially reciprocate inside the cylinder hole portion 231 while an outer peripheral wall of the large diameter portion 111 slides on the inner peripheral wall of the cylinder hole portion 231. When the plunger 11 reciprocates inside the cylinder hole portion 231, a capacity of the pressure chamber 200 increases or decreases. As described above, the plunger 11 can axially reciprocate inside the cylinder hole portion 231 such that one end of the plunger 11 is located in the pressure chamber 200.

According to the present embodiment, a seal holder 14 is provided inside the holder support portion 24. The seal holder 14 is formed of a metal such as stainless steel in a cylindrical shape. The seal holder 14 is provided such that an outer wall thereof is fitted into an inner wall of the holder support portion 24.

A variable capacity chamber 201 whose capacity changes when the plunger 11 reciprocates is provided between the seal holder 14 and a step surface between the large diameter portion 111 and the small diameter portion 112 of the plunger 11.

Here, an annular space 202, which is a space having an annular shape, is formed between the lower housing 22, an outer peripheral wall of the cylinder 23, an inner peripheral wall of the holder support portion 24, and the seal holder 14. The annular space 202 is connected to a hole portion (not shown) penetrating the lower housing 22 in the plate thickness direction. In addition, the annular space 202 is connected to the variable capacity chamber 201.

A substantially disk-shaped spring seat 12 is provided at an end portion of the small diameter portion 112 of the plunger 11 on a side opposite to the large diameter portion 111. A spring 13 is provided between the seal holder 14 and the spring seat 12. The spring 13 is, for example, a coil spring, and one end of the spring 13 is in contact with the spring seat 12, and the other end of the spring 13 is in contact with the seal holder 14 via a spacer. The spring 13 urges the plunger 11 to a side opposite to the pressure chamber 200 via the spring seat 12. When the high-pressure pump 10 is attached to the engine head 2 of the engine 1, a lifter 5 is attached to the end portion of the small diameter portion 112 of the plunger 11 on the side opposite to the large diameter portion 111.

When the high-pressure pump 10 is attached to the engine 1, the lifter 5 is in contact with a cam 4 of a camshaft that rotates in conjunction with a drive shaft of the engine 1. Accordingly, when the engine 1 is rotating, the plunger 11 axially reciprocates due to the rotation of the cam 4. At this time, the capacities of the pressure chamber 200 and the variable capacity chamber 201 change periodically.

The cover 26 is formed of a metal such as stainless steel. The cover 26 includes a cover cylinder portion 261 and a cover bottom portion 262. The cover cylinder portion 261 is formed in a substantially octagonal cylindrical shape. The cover cylinder portion 261 has an octagonal cylindrical cover outer peripheral wall.

The cover bottom portion 262 is provided integrally with the cover cylinder portion 261 so as to close one end of the cover cylinder portion 261. That is, the cover 26 is formed in a bottomed cylindrical shape. According to the present embodiment, the cover 26 is provided by, for example, pressing a plate-shaped member. Therefore, the cover 26 has a relatively small thickness. Since the cover 26 is not provided with a high-pressure chamber, the thickness of the cover 26 can be reduced.

The cover 26 includes a cover hole portion 266 and a cover hole portion 267. The cover hole portion 266 and the cover hole portion 267 are each formed in a substantially cylindrical shape so as to connect an inner peripheral wall and an outer peripheral wall, that is, the cover outer peripheral wall of the cover cylinder portion 261. The cover hole portion 266 and the cover hole portion 267 are formed substantially coaxially so as to face each other with an axis of the cover cylinder portion 261 sandwiched therebetween.

The cover 26 accommodates the upper housing 21 inside, and is provided such that an end portion of the cover cylinder portion 261 on a side opposite to the cover bottom portion 262 is in contact with a surface of the lower housing 22 on an upper housing 21 side. The cover 26 forms a fuel chamber 260 between the upper housing 21, the lower housing 22, and the cylinder 23. Here, the end portion of the cover cylinder portion 261 and the lower housing 22 are joined to each other over the entire region in a circumferential direction by, for example, welding. Accordingly, a space between the cover cylinder portion 261 and the lower housing 22 is kept liquid-tight. In addition, the cover 26 is provided such that the cover hole portion 266 corresponds to the intake hole portion 212 of the upper housing 21 and the cover hole portion 267 corresponds to the discharge hole portion 214 of the upper housing 21.

In this way, the cover 26 covers at least a part of the cylinder 23, the upper housing 21, and the lower housing 22, and forms the fuel chamber 260 between the cylinder 23, the upper housing 21, and the lower housing 22.

The cover 26 is provided with a supply passage portion (not shown). The supply passage portion is formed in a cylindrical shape, and an inner space of the supply passage portion is provided to communicate with the fuel chamber 260. The fuel supply pipe is connected to the supply passage portion. Accordingly, the fuel discharged from the fuel pump flows into the fuel chamber 260 through the fuel supply pipe and the supply passage portion.

The intake valve portion 300 is provided inside the intake hole portion 212 of the upper housing 21, that is, in the intake passage 216. The intake valve portion 300 includes a seat member 31, a stopper 35, a valve member 40, a spring 39, and the like.

The seat member 31 is formed of a metal such as stainless steel in a substantially disk shape. The seat member 31 is provided in the intake passage 216 inside the intake hole portion 212. Here, an outer peripheral wall of the seat member 31 is press-fitted into an inner peripheral wall of the intake hole portion 212.

The seat member 31 includes a communication passage 32 and a valve seat 310. The communication passage 32 is formed in a substantially cylindrical shape at a center of the seat member 31 so as to allow communication between one surface and the other surface of the seat member 31.

The valve seat 310 is formed in an annular shape around the communication passage 32 on a surface of the seat member 31 at a pressure chamber 200 side.

The stopper 35 is formed of a metal such as stainless steel. The stopper 35 is provided on the pressure chamber 200 side with respect to the seat member 31 in the intake passage 216.

A part of the intake passage 216 is formed in the communication passage 32 of the seat member 31. Therefore, the fuel in the fuel chamber 260 can flow into the pressure chamber 200 through the intake passage 216 formed in the communication passage 32 and the intake hole 232.

The valve member 40 is provided on the pressure chamber 200 side of the seat member 31. The valve member 40 can reciprocate in an axial direction of the seat member 31 between the seat member 31 and the stopper 35.

A surface of the valve member 40 on a seat member 31 side can come into contact with the surface of the seat member 31 on the pressure chamber 200 side, that is, the valve seat 310, and a surface of the valve member 40 on a stopper 35 side can come into contact with a surface of the stopper 35 on the seat member 31 side.

When the surface of the valve member 40 on the seat member 31 side is separated from the surface of the seat member 31 on the pressure chamber 200 side, that is, the valve seat 310, the valve member 40 can be open to permit the flow of the fuel in the communication passage 32, and when the surface of the valve member 40 on the seat member 31 side is in contact with the valve seat 310, the valve member 40 can be closed to restrict the flow of the fuel in the communication passage 32.

When the valve member 40 is open, the fuel is permitted to flow in the communication passage 32, and the fuel on a fuel chamber 260 side can flow toward the pressure chamber 200 through the communication passage 32 and the intake hole 232. In addition, the fuel on the pressure chamber 200 side can flow toward the fuel chamber 260 through the intake hole 232 and the communication passage 32. At this time, the fuel flows around the valve member 40.

When the valve member 40 is closed, the fuel is restricted from flowing in the communication passage 32, and the fuel on the fuel chamber 260 side is restricted from flowing toward the pressure chamber 200 through the communication passage 32 and the intake hole 232. In addition, the fuel on the pressure chamber 200 side is restricted from flowing toward the fuel chamber 260 through the intake hole 232 and the communication passage 32.

The spring 39 is, for example, a coil spring, and is provided between the stopper 35 and the valve member 40. One end of the spring 39 is in contact with the surface of the stopper 35 on the seat member 31 side, and the other end of the spring 39 is in contact with a surface of the valve member 40 on the pressure chamber 200 side. The spring 39 urges the valve member 40 toward the seat member 31.

The electromagnetic drive portion 500 is provided to protrude to a radially outer side of the cover outer peripheral wall from the intake hole portion 212 of the upper housing 21 through the cover hole portion 266 of the cover 26.

The electromagnetic drive portion 500 includes a first electromagnetic drive portion 501 (see FIG. 3) as a "solenoid assembly" and a second electromagnetic drive portion 502 (see FIG. 2) as a "coil assembly".

Figure 3:
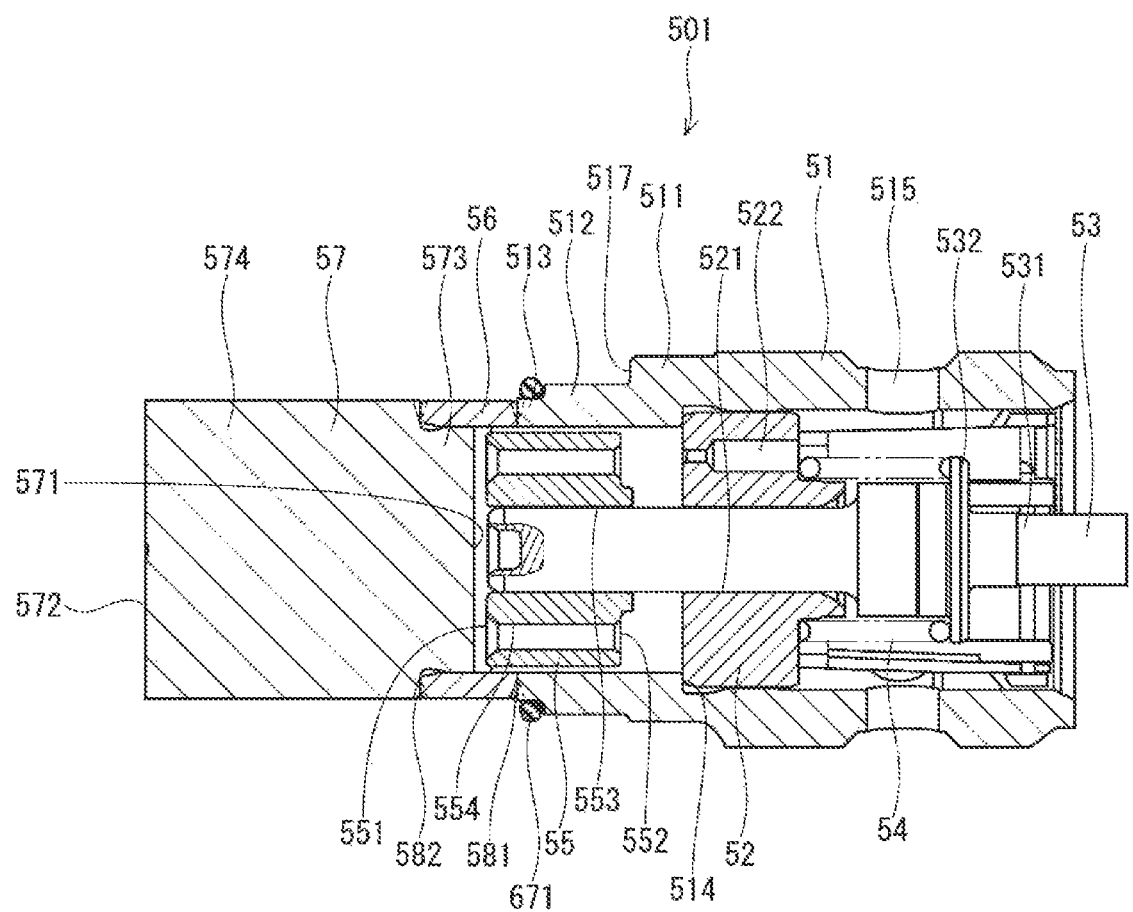
FIG. 3 is a cross-sectional view showing a solenoid assembly of the high-pressure pump according to the first embodiment.

As shown in FIG. 3, the first electromagnetic drive portion 501 as the "solenoid assembly" includes a cylinder member 51, a guide member 52, a needle 53, a spring 54 as an urging member, a movable core 55, a magnetic throttle portion 56, a fixed core 57, and the like.

The cylinder member 51 includes a first cylinder portion 511, a second cylinder portion 512, and a third cylinder portion 513. The first cylinder portion 511, the second cylinder portion 512, and the third cylinder portion 513 are each formed of, for example, a magnetic material. The first cylinder portion 511 is formed in a substantially cylindrical shape.

The second cylinder portion 512 is formed in a cylindrical shape. The second cylinder portion 512 is formed substantially coaxially and integrally with the first cylinder portion 511 such that an end portion of the second cylinder portion 512 is connected to an end portion of the first cylinder portion 511. A maximum outer diameter of the second cylinder portion 512 is smaller than an outer diameter of the end portion of the first cylinder portion 511 on a second cylinder portion 512 side.

The third cylinder portion 513 is formed in a substantially cylindrical shape. The third cylinder portion 513 is formed substantially coaxially and integrally with the second cylinder portion 512 such that an end portion of the third cylinder portion 513 is connected to an end portion of the second cylinder portion 512 on a side opposite to the first cylinder portion 511. An outer diameter of the third cylinder portion 513 is smaller than the maximum outer diameter of the second cylinder portion 512.

A thread is formed on an outer peripheral wall of an end portion of the first cylinder portion 511 on a side opposite to the second cylinder portion 512. A thread groove corresponding to the thread of the first cylinder portion 511 is formed on an inner peripheral wall of an end portion of the intake hole portion 212 of the upper housing 21 on a side opposite to the pressure chamber 200.

The cylinder member 51 is provided such that the thread of the first cylinder portion 511 is screw-coupled to the thread groove of the upper housing 21. Here, an end surface of the first cylinder portion 511 of the cylinder member 51 on the pressure chamber 200 side urges the seat member 31 and the stopper 35 toward the pressure chamber 200. Therefore, the seat member 31 and the stopper 35 are in contact with each other, and an axial movement thereof is restricted.

The first cylinder portion 511 of the cylinder member 51 is located inside the cover hole portion 266 of the cover 26. Therefore, an end portion of the first cylinder portion 511 on the pressure chamber 200 side is located inside the cover cylinder portion 261, and an end portion of the first cylinder portion 511 on the side opposite to the pressure chamber 200, the second cylinder portion 512, and the third cylinder portion 513 are located outside the cover cylinder portion 261. An axis of the cylinder member 51 is orthogonal to an axis Ax1 of the cylinder 23.

An inner diameter of a portion in the cylinder member 51 on the pressure chamber 200 side is larger than an inner diameter of a portion in the cylinder member 51 on the side opposite to the pressure chamber 200. A substantially annular step surface 514 facing the pressure chamber 200 is formed inside the cylinder member 51. The step surface 514 is located on the pressure chamber 200 side slightly with respect to a connection portion between the first cylinder portion 511 and the second cylinder portion 512 in an axial direction of the cylinder member 51 in order to ensure a thickness.

The first cylinder portion 511 is formed with hole portions 515 that allows communication between an inner peripheral wall and an outer peripheral wall. The hole portions 515 are formed at equal intervals in an circumferential direction of the first cylinder portion 511. The hole portions 515 are formed to straddle the cover hole portion 266 and the fuel chamber 260 in an axial direction of the first cylinder portion 511. Therefore, the fuel in the fuel chamber 260 can flow into the first cylinder portion 511 through the hole portions 515 and flow toward the pressure chamber 200 through the intake passage 216.

A welding ring 519 is provided on a radially outer side of the first cylinder portion 511 of the cylinder member 51 outside the cover 26. The welding ring 519 is formed of, for example, a metal in a substantially cylindrical shape. The welding ring 519 is provided such that an end portion on the pressure chamber 200 side expands to the radially outer side, and is in contact with the periphery of the cover hole portion 266 of the cover outer peripheral wall. The end portion of the welding ring 519 on the pressure chamber 200 side is welded to the cover outer peripheral wall over the entire range in the circumferential direction, and a portion of the welding ring 519 on the side opposite to the pressure chamber 200 is welded to the outer peripheral wall of the first cylinder portion 511 over the entire range in the circumferential direction. More specifically, at the end portion of the welding ring 519 on the pressure chamber 200 side, a welded portion 591, which is formed by melting through welding the welding ring 519 and the cover 26, followed by cooling and solidification, connects the welding ring 519 and the cover 26 over the entire range in the circumferential direction. In addition, at the portion of the welding ring 519, a welded portion 592, which is formed by melting through welding the welding ring 519 and the cylinder member 51, followed by cooling and solidification, connects the welding ring 519 and the cylinder member 51 over the entire range in the circumferential direction. Accordingly, the fuel in the fuel chamber 260 is prevented from leaking to the outside of the cover 26 through a gap between the cover hole portion 266 and the outer peripheral wall of the first cylinder portion 511. Since a load under a high pressure is received by screws of the cylinder member 51, no stress is applied to the welding ring 519.

The guide member 52 is provided inside the first cylinder portion 511. The guide member 52 is formed of, for example, a metal in a substantially columnar shape. The guide member 52 is fixed inside the first cylinder portion 511 such that an outer peripheral wall thereof is fitted into the inner peripheral wall of the first cylinder portion 511 and an outer edge portion of one end surface thereof is in contact with the step surface 514 of the cylinder member 51.

The guide member 52 has a shaft hole 521 and a communication hole 522. The shaft hole 521 is formed to axially penetrate a center of the guide member 52.

The communication hole 522 is formed on a radially outer side of the shaft hole 521 so as to allow communication between a surface on the pressure chamber 200 side and a surface on the side opposite to the pressure chamber 200. The communication hole 522 allows communication between a space on the pressure chamber 200 side with respect to the guide member 52 and a space on the side opposite to the pressure chamber 200 with respect to the guide member 52 in a space inside the first cylinder portion 511.

The needle 53 is provided inside the cylinder member 51. The needle 53 is formed of, for example, a metal. The needle 53 includes a needle body 531 and a locking portion 532. The needle body 531 is formed in a substantially columnar shape. The locking portion 532 is provided integrally with the needle body 531 so as to extend to a radially outer side in a substantially annular shape from an outer peripheral wall of the needle body 531.

The needle 53 is provided such that the needle body 531 is inserted into the shaft hole 521 of the guide member 52 and the locking portion 532 is located on the pressure chamber 200 side with respect to the guide member 52. An end portion of the needle body 531 on the pressure chamber 200 side is located inside the communication passage 32 of the seat member 31 and can come into contact with a surface of the valve member 40 on the side opposite to the pressure chamber 200. An end portion of the needle body 531 on the side opposite to the pressure chamber 200 is located on the side opposite to the pressure chamber 200 with respect to an end surface of the third cylinder portion 513 on a side opposite to the second cylinder portion 512.

An outer diameter of a portion of the needle body 531 corresponding to the shaft hole 521 is slightly smaller than an inner diameter of the shaft hole 521. An outer diameter of the locking portion 532 is larger than an outer diameter of the shaft hole 521. The needle 53 can axially reciprocate inside the cylinder member 51. The outer peripheral wall of the needle body 531 is slidable with the shaft hole 521. Therefore, the guide member 52 can guide an axial movement of the needle 53.

The spring 54 is, for example, a coil spring, and is provided on the radially outer side of the needle body 531. One end of the spring 54 is in contact with a surface of the guide member 52 on the pressure chamber 200 side, and the other end of the spring 54 is in contact with a surface of the locking portion 532 on the side opposite to the pressure chamber 200. That is, the locking portion 532 locks the other end of the spring 54. The spring 54 urges the needle 53 toward the pressure chamber 200. In addition, an urging force of the spring 54 is larger than an urging force of the spring 39. Therefore, the spring 54 urges the valve member 40 toward the pressure chamber 200 via the needle 53, and presses the surface of the valve member 40 on the pressure chamber 200 side against the stopper 35. At this time, the valve member 40 is separated from the valve seat 310 of the seat member 31 and is open.

The movable core 55 is formed of, for example, a magnetic material in a substantially columnar shape. The movable core 55 has a shaft hole 553 and a communication hole 554. The shaft hole 553 is formed to axially penetrate a center of the movable core 55.

The movable core 55 is provided integrally with the needle 53 such that an inner peripheral wall of the shaft hole 553 is fitted into an outer peripheral wall of the end portion of the needle body 531 on the side opposite to the pressure chamber 200. Here, the movable core 55 is press-fitted into the needle 53 and cannot move relative to the needle 53.

The communication hole 554 is formed on a radially outer side of the shaft hole 553 so as to allow communication between an end surface 551 on the side opposite to the pressure chamber 200 and an end surface 552 on the pressure chamber 200 side. The communication hole 554 reduces a fluid resistance during reciprocation of the movable core 55 and enables the movable core 55 to move with a high response. In addition, with the communication hole 554, the fuel can be supplied to a space between the movable core 55 and the fixed core 57, and occurrence of cavitation erosion can be prevented by preventing a sudden change in pressure.

In the present embodiment, a center of gravity of the needle 53 and the movable core 55 that are integrally provided is always located on an axis of the needle 53 and inside the guide member 52 from valve opening to valve closing. Therefore, the axial movement of the needle 53 and the movable core 55 that are integrally provided can be stabilized.

The magnetic throttle portion 56 is formed of, for example, a non-magnetic member in a substantially cylindrical shape. An inner diameter and an outer diameter of the magnetic throttle portion 56 are substantially the same as an inner diameter and the outer diameter of the third cylinder portion 513. The magnetic throttle portion 56 is provided on the side opposite to the pressure chamber 200 with respect to the cylinder member 51 so as to be substantially coaxial with the third cylinder portion 513. The magnetic throttle portion 56 and the third cylinder portion 513 are joined by, for example, welding. More specifically, a welded portion 581, which is formed by melting through welding the magnetic throttle portion 56 and the cylinder member 51, followed by cooling and solidification, connects the magnetic throttle portion 56 and the cylinder member 51. Here, the end surface 551 of the movable core 55 on the side opposite to the pressure chamber 200 is located inside the magnetic throttle portion 56.

The fixed core 57 is formed of, for example, a magnetic material. The fixed core 57 includes a fixed core small diameter portion 573 and a fixed core large diameter portion 574. The fixed core small diameter portion 573 is formed in a substantially columnar shape. An outer diameter of the fixed core small diameter portion 573 is slightly larger than the inner diameter of the magnetic throttle portion 56. The fixed core small diameter portion 573 is press-fitted into the magnetic throttle portion 56.

The fixed core large diameter portion 574 is formed in a substantially columnar shape, includes an axial end portion connected to an end portion of the fixed core small diameter portion 573 so as to be coaxial with the fixed core small diameter portion 573, and is provided integrally with the fixed core small diameter portion 573. An outer diameter of the fixed core large diameter portion 574 is larger than the outer diameter of the fixed core small diameter portion 573, and is substantially the same as the outer diameter of the magnetic throttle portion 56.

The fixed core 57 is provided on a side of the cylinder member 51 opposite to the pressure chamber 200 such that the fixed core small diameter portion 573 is located inside an end portion of the magnetic throttle portion 56 on a side opposite to the cylinder member 51. The fixed core 57 and the magnetic throttle portion 56 are joined by, for example, welding. More specifically, a welded portion 582, which is formed by melting through welding the fixed core 57 and the magnetic throttle portion 56, followed by cooling and solidification, connects the fixed core 57 and the magnetic throttle portion 56. Here, an annular step surface between the fixed core small diameter portion 573 and the fixed core large diameter portion 574 is in contact with an end surface of the magnetic throttle portion 56 on the side opposite to the cylinder member 51. In addition, an end surface 571 of the fixed core 57 on the pressure chamber 200 side is located on the pressure chamber 200 side with respect to the end surface of the magnetic throttle portion 56 on the side opposite to the cylinder member 51. In addition, the fixed core 57 is substantially coaxial with the magnetic throttle portion 56. In a state in which the spring 54 urges the needle 53 toward the pressure chamber 200 and the valve member 40 is separated from the valve seat 310, a gap is formed between the end surface 571 of the fixed core 57 on the pressure chamber 200 side and the end surface 551 of the movable core 55 on the side opposite to the pressure chamber 200.

In this way, the fixed core 57 is provided to face the movable core 55 in the axial direction of the needle 53.

In the present embodiment, the cylinder member 51, the guide member 52, the spring 54, the needle 53, the movable core 55, the magnetic throttle portion 56, and the fixed core 57 are sub-assembled so as to be integrally assembled in advance to form the first electromagnetic drive portion 501 (see FIG. 3).

Figure 2:
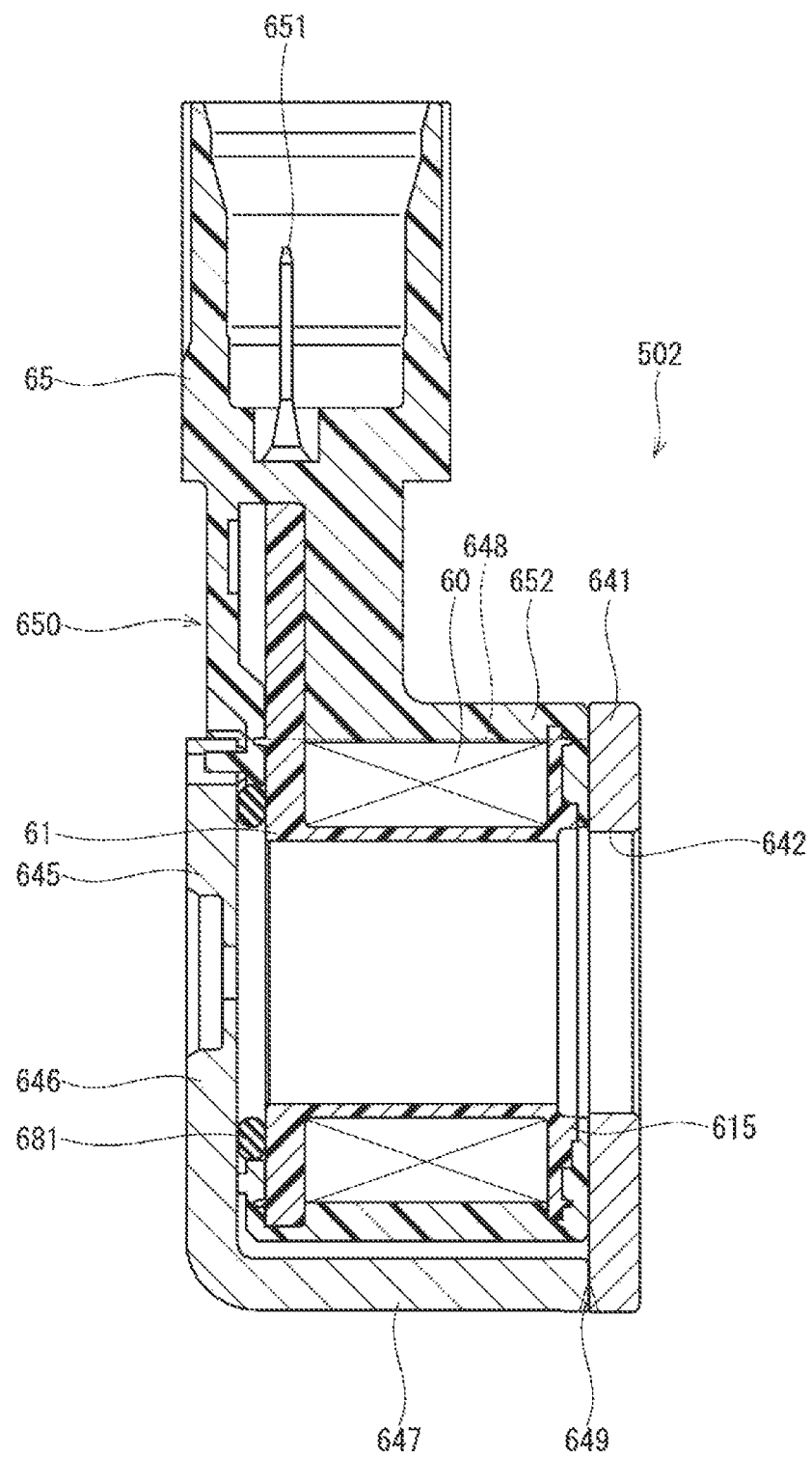
FIG. 2 is a cross-sectional view showing a coil assembly of the high-pressure pump according to the first embodiment.

As shown in FIG. 2, the second electromagnetic drive portion 502 as the "coil assembly" includes a coil sub-assembly 650, a yoke 641 as a "first yoke", a yoke 645 as a "second yoke", an O-ring 681, and the like.

The coil sub-assembly 650 includes a connector 65, a terminal 651 provided in the connector 65, a cylindrical coil 60 connected to the terminal 651, and a spool 61 and a base portion 652 as "resin portions" with which the terminal 651 and the coil 60 are covered.

Specifically, the connector 65 is formed of a resin in a cylindrical shape. The terminal 651 is formed of a conductive metal, and has one end located inside the connector 65.

The coil 60 is formed in a cylindrical shape by winding a winding, and is connected to the other end of the terminal 651. The spool 61 is formed of a resin so as to cover the other end side of the terminal 651, and both axial ends and a radially inner side of the coil 60. The coil 60 is formed in a cylindrical shape by winding a winding around a cylindrical portion of the spool 61.

The base portion 652 is provided integrally with the connector 65 by a resin so as to cover a radially outer side of the coil 60 and both axial ends of the spool 61.

In this way, a part of the terminal 651 and the coil 60 are covered with the spool 61 and the base portion 652 as "resin portions".

The yoke 641 is formed of a magnetic material in a plate shape. The yoke 641 includes a yoke hole portion 642. The yoke hole portion 642 is formed in a substantially cylindrical shape so as to penetrate the yoke 641 in the plate thickness direction.

The yoke 641 is provided integrally with the coil sub-assembly 650 such that one surface thereof is in contact with an end surface of the base portion 652 in an axial direction of the coil 60. Here, the yoke 641 is provided such that a columnar space inside the spool 61 and the yoke hole portion 642 are coaxial with each other.

The yoke 645 is formed of a magnetic material. The yoke 645 includes a yoke bottom portion 646, a yoke cylinder portion 647, and a yoke notch portion 648. The yoke bottom portion 646 is formed in a plate shape. The yoke cylinder portion 647 is provided integrally with the yoke bottom portion 646 so as to extend in a cylindrical shape from an outer edge portion of the yoke bottom portion 646. The yoke notch portion 648 is formed by cutting out a part of the yoke cylinder portion 647 in a circumferential direction.

The yoke 645 is provided integrally with the yoke 641 and the coil sub-assembly 650 in a state in which an end portion of the yoke cylinder portion 647 on a side opposite to the yoke bottom portion 646 is in contact with an outer edge portion of one surface of the yoke 641 while the coil sub-assembly 650 is sandwiched between the yoke 645 and the yoke 641. The end portion of the yoke cylinder portion 647 and the yoke 641 are joined by, for example, welding. More specifically, a welded portion 649, which is formed by melting through welding the yoke cylinder portion 647 and the yoke 641, followed by cooling and solidification, connects the yoke cylinder portion 647 and the yoke 641.

Here, the connector 65 is located on a radially outer side of the yoke 645 with respect to the yoke notch portion 648. A surface of the yoke bottom portion 646 on a yoke 641 side is in contact with a surface of the base portion 652 on a side opposite to the yoke 641.

The O-ring 681 is formed of an elastic member such as rubber, that is, a resin material having an elastic modulus of a predetermined value or less in an annular shape. The O-ring 681 is provided between the spool 61 and the yoke bottom portion 646 so as to be substantially coaxial with the coil 60. The O-ring 681 is sandwiched between the spool 61 and the yoke bottom portion 646, and is axially compressed. Accordingly, a space between the spool 61 and the yoke bottom portion 646 is kept liquid-tight, and water or the like can be prevented from entering the space inside the spool 61 from the outside of the second electromagnetic drive portion 502 through the yoke notch portion 648.

The electromagnetic drive portion 500 is formed by assembling the first electromagnetic drive portion 501 as the "solenoid assembly" shown in FIG. 3 and the second electromagnetic drive portion 502 as the "coil assembly" shown in FIG. 2.

Figure 4:
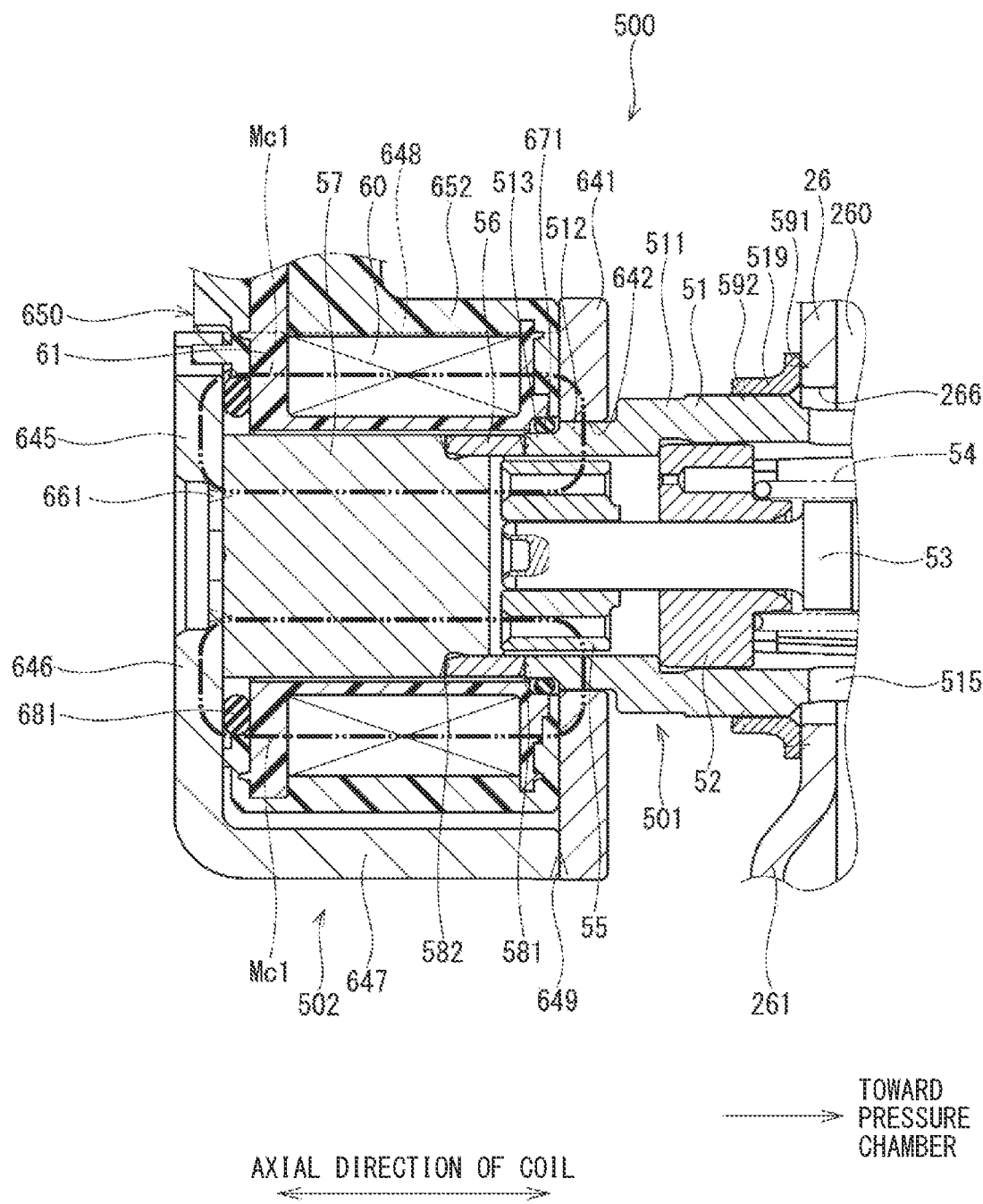
FIG. 4 is a cross-sectional view showing a part of an electromagnetic drive portion of the high-pressure pump according to the first embodiment.

As shown in FIG. 4, the electromagnetic drive portion 500 includes a welded portion 661 as a "first connection portion" and an O-ring 671 as a "second connection portion".

The welded portion 661 as the "first connection portion" connects the second electromagnetic drive portion 502 as the "coil assembly" and the fixed core 57 on a side of the second electromagnetic drive portion 502 opposite to the pressure chamber 200.

More specifically, the first electromagnetic drive portion 501 is provided such that an end surface 572 of the fixed core 57 on the side opposite to the pressure chamber 200 is in contact with a surface of the yoke bottom portion 646 on the pressure chamber 200 side. The end surface 572 of the fixed core 57 and the yoke bottom portion 646 are joined by welding.

More specifically, the welded portion 661, which is formed by melting through welding the yoke bottom portion 646 and the fixed core 57, followed by cooling and solidification, connects the yoke bottom portion 646 and the fixed core 57. Accordingly, the yoke 645 and the fixed core 57 cannot move relative to each other. The welded portion 661 is formed in a continuous annular shape or an intermittent annular shape on the end surface 572 of the fixed core 57. In this way, the welded portion 661 connects the yoke bottom portion 646 of the second electromagnetic drive portion 502 and the fixed core 57 on the side of the second electromagnetic drive portion 502 opposite to the pressure chamber 200 (see FIG. 4).

The O-ring 671 as the "second connection portion" connects the second electromagnetic drive portion 502 and the cylinder member 51 on the pressure chamber 200 side of the second electromagnetic drive portion 502 as the "coil assembly".

Figure 5:
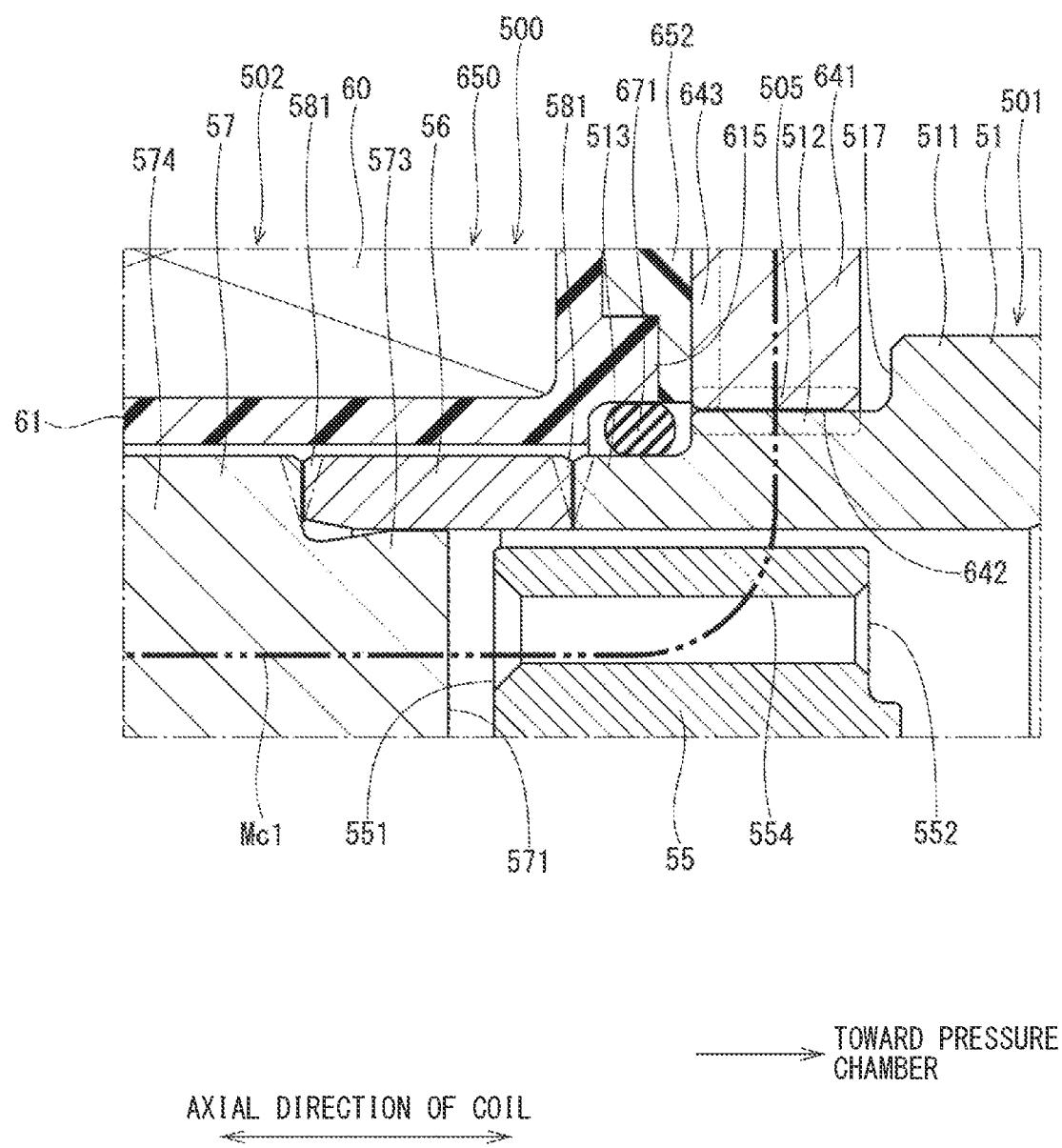
FIG. 5 is a cross-sectional view showing a second connection portion and a vicinity thereof in the high-pressure pump according to the first embodiment.

More specifically, the O-ring 671 is provided in a substantially cylindrical space between the third cylinder portion 513 of the cylinder member 51, a protruding portion 615 of the spool 61, and the base portion 652 (see FIG. 5).

The O-ring 671 is formed of an elastic member such as rubber, that is, a resin material having an elastic modulus of a predetermined value or less in an annular shape. The O-ring 671 is sandwiched between an outer peripheral wall of the third cylinder portion 513 of the cylinder member 51 and inner peripheral walls the protruding portion 615 of the spool 61 and the base portion 652, and is compressed radially. Accordingly, a space between the outer peripheral wall of the third cylinder portion 513 of the cylinder member 51 and the inner peripheral walls of the protruding portion 615 of the spool 61 and the base portion 652 is kept liquid-tight. In this way, the O-ring 671 connects the spool 61 and the base portion 652 as "resin portions" of the second electromagnetic drive portion 502 and the cylinder member 51 on the pressure chamber 200 side of the second electromagnetic drive portion 502 (see FIG. 4).

In the present embodiment, an outer diameter of the second cylinder portion 512 of the cylinder member 51 is smaller than an inner diameter of the yoke hole portion 642 of the yoke 641. Therefore, the cylinder member 51 is not press-fitted into the yoke hole portion 642, and a gap is formed between the second cylinder portion 512 and the yoke hole portion 642 in at least a part of the cylinder member 51 in a circumferential direction.

In the present embodiment, an annular step surface 517 between the first cylinder portion 511 and the second cylinder portion 512 of the cylinder member 51 and a surface of the yoke 641 on the pressure chamber 200 side are separated from each other (see FIG. 5). Therefore, an annular gap is formed between the yoke 641 and the step surface 517 of the cylinder member 51 in the axial direction of the cylinder member 51.

A substantially cylindrical gap is formed between outer peripheral walls of the magnetic throttle portion 56 and the fixed core large diameter portion 574 and the inner peripheral wall of the spool 61.

With the above configuration, the pressure chamber 200 side of the second electromagnetic drive portion 502 as the "coil assembly" is supported by the cylinder member 51 via the O-ring 671 formed of an elastic member in a radial direction of the cylinder member 51. Accordingly, vibration of the engine 1 and vibration of the high-pressure pump 10 during operation can be effectively prevented from being transmitted to the second electromagnetic drive portion 502 via the cylinder member 51.

A harness 6 is connected to the connector 65. Accordingly, the terminal 651 and a female terminal of the harness 6 are electrically connected to each other, and an electric power is supplied to the coil 60 via the harness 6 and the terminal 651.

When the second electromagnetic drive portion 502 as the "coil assembly" vibrates while the terminal 651 and the female terminal of the harness 6 are connected to each other, the terminal 651 and the female terminal of the harness 6 may slide and wear.

As shown in FIG. 4, when the coil 60 is energized, a magnetic circuit Mc1 passing through the fixed core 57, the yoke bottom portion 646, the yoke cylinder portion 647, the yoke 641, the second cylinder portion 512, and the movable core 55 is provided in a manner of avoiding the magnetic throttle portion 56. Accordingly, an attraction force is generated between the fixed core 57 and the movable core 55, and the movable core 55 moves toward the fixed core 57 together with the needle 53 against the urging force of the spring 54. As a result, the valve member 40 moves toward the seat member 31 due to the urging force of the spring 39 and is closed.

In this way, one end of the needle 53 cooperates with the valve member 40.

As described above, by energizing the coil 60, the yoke 641 as the "first yoke" can form the magnetic circuit Mc1 on the pressure chamber 200 side with respect to the coil 60 in the axial direction of the coil 60. In addition, by energizing the coil 60, the yoke 645 as the "second yoke" can form the magnetic circuit Mc1 on the side opposite to the pressure chamber 200 with respect to the coil 60 in the axial direction of the coil 60.

As shown in FIG. 5, in the cylinder member 51 and the yoke 641 as the "first yoke", a magnetic path 505 through which the magnetic circuit Mc1 passes is formed by a part of the second cylinder portion 512 of the cylinder member 51 and a part of the yoke 641 that are adjacent to each other in the radial direction of the cylinder member 51. The O-ring 671 as the "second connection portion" is provided on a coil 60 side with respect to the magnetic path 505.

Accordingly, water or the like can be prevented from entering the spool 61 from the outside of the electromagnetic drive portion 500 through the gap between the second cylinder portion 512 of the cylinder member 51 and the yoke hole portion 642 of the yoke 641.

As shown in FIG. 5, the yoke 641 as the "first yoke" includes a facing portion 643 facing the base portion 652 of the coil sub-assembly 650 in the axial direction of the coil 60. The O-ring 671 as the "second connection portion" is provided on the coil 60 side with respect to the facing portion 643. More specifically, the O-ring 671 is provided on the coil 60 side with respect to a virtual plane that passes through the facing portion 643 and that is orthogonal to an axis of the coil 60.

Accordingly, water or the like can be prevented from entering the spool 61 from the outside of the electromagnetic drive portion 500 through a space between the yoke notch portion 648 and the base portion 652 of the coil sub-assembly 650 and the facing portion 643.

Next, a method for assembling the first electromagnetic drive portion 501 and the second electromagnetic drive portion 502 will be described.

As shown in FIG. 3, first, the O-ring 671 is provided on a radially outer side of the third cylinder portion 513 of the cylinder member 51 in the sub-assembled first electromagnetic drive portion 501.

Subsequently, the fixed core 57 of the first electromagnetic drive portion 501 provided with the O-ring 671 is inserted into the yoke hole portion 642 of the sub-assembled second electromagnetic drive portion 502 and the spool 61.

Subsequently, the end surface 572 of the fixed core 57 and the yoke bottom portion 646 are brought into contact with each other, and the fixed core 57 and the yoke bottom portion 646 are welded to form the welded portion 661 (see FIG. 4). Accordingly, the assembly of the first electromagnetic drive portion 501 and the second electromagnetic drive portion 502 is completed.

When the coil 60 is not energized, the valve member 40 is open and the fuel chamber 260 is in communication with the pressure chamber 200. At this time, when the plunger 11 moves toward the side opposite to the pressure chamber 200, the capacity of the pressure chamber 200 increases, and the fuel in the fuel chamber 260 flows into the first cylinder portion 511 through the hole portion 515, and the fuel is sucked into the pressure chamber 200 through the intake hole 232. Further, when the plunger 11 moves toward the pressure chamber 200 with the valve member 40 open, the capacity of the pressure chamber 200 decreases, and the fuel in the pressure chamber 200 flows toward the valve member 40 through the intake hole 232.

When the coil 60 is energized while the plunger 11 is moving toward the pressure chamber 200, the valve member 40 is closed, blocking the flow of the fuel between the fuel chamber 260 and the pressure chamber 200. When the plunger 11 further moves toward the pressure chamber 200 with the valve member 40 closed, the capacity of the pressure chamber 200 further decreases, and the fuel in the pressure chamber 200 is pressurized.

In this way, the amount of the fuel to be pressurized in the pressure chamber 200 is adjusted by closing the valve member 40 with the electromagnetic drive portion 500 at any timing when the plunger 11 is moving toward the pressure chamber 200. In the present embodiment, the intake valve portion 300 and the electromagnetic drive portion 500 form a normally open type valve device.

As shown in FIG. 1, the discharge passage portion 700 protrudes to the radially outer side of the cover outer peripheral wall from the discharge hole portion 214 of the upper housing 21 through the cover hole portion 267 of the cover 26.

The discharge passage portion 700 includes a discharge joint 70, a discharge valve 75, a relief valve 91, and the like.

The discharge joint 70 is formed of a metal such as stainless steel in a substantially cylindrical shape. A thread is formed on an outer peripheral wall of a portion separated by a predetermined distance from one end portion toward the other end portion of the discharge joint 70. A thread groove corresponding to the thread of the discharge joint 70 is formed on an inner peripheral wall of the discharge hole portion 214 of the upper housing 21. The discharge joint 70 is provided such that the thread is screw-coupled to the thread groove of the upper housing 21.

The discharge joint 70 is provided inside the cover hole portion 267 of the cover 26. An end portion of the discharge joint 70 on the pressure chamber 200 side is located inside the discharge hole portion 214 inside the cover cylinder portion 261, that is, in the discharge passage 217, and an end portion of the discharge joint 70 on the side opposite to the pressure chamber 200 is located outside the cover cylinder portion 261.

The discharge joint 70 forms a discharge passage 705 therein. The fuel discharged from the pressure chamber 200 flows through the discharge passage 705. Here, the discharge joint 70 corresponds to a "discharge passage forming portion".

A welding ring 709 is provided on a radially outer side of the discharge joint 70 outside the cover 26. The welding ring 709 is formed of, for example, a metal in a substantially cylindrical shape. The welding ring 709 is provided such that an end portion thereof on the pressure chamber 200 side expands to the radially outer side, and is in contact with the periphery of the cover hole portion 267 on the cover outer peripheral wall. The end portion of the welding ring 709 on the pressure chamber 200 side is welded to the cover outer peripheral wall over the entire range in the circumferential direction, and a portion of the welding ring 709 on the side opposite to the pressure chamber 200 is welded to an outer peripheral wall of the discharge joint 70 over the entire range in the circumferential direction. Accordingly, the fuel in the fuel chamber 260 is prevented from leaking to the outside of the cover 26 through a gap between the cover hole portion 267 and the outer peripheral wall of the discharge joint 70.

The high-pressure fuel pipe 8 is connected to the end portion of the discharge joint 70 on the side opposite side to the pressure chamber 200. Accordingly, the fuel that has flowed into the fuel chamber 260 from the fuel supply pipe through the supply passage portion of the high-pressure pump 10 is pressurized in the pressure chamber 200, and is discharged to the high-pressure fuel pipe 8 through the discharge passage 705 inside the discharge joint 70. The high-pressure fuel discharged to the high-pressure fuel pipe 8 is supplied to the fuel rail through the high-pressure fuel pipe 8.

The discharge valve 75 and the relief valve 91 are provided in the discharge passage 705 inside the discharge joint 70.

The discharge valve 75 in the discharge passage 705 is open when a differential pressure between the fuel on the pressure chamber 200 side and the fuel on a high-pressure fuel pipe 8 side is equal to or larger than a predetermined value with respect to the discharge valve 75, and the flow of the fuel in the discharge passage 705 is permitted. On the other hand, the discharge valve 75 in the discharge passage 705 is closed when the differential pressure between the fuel on the pressure chamber 200 side and the fuel on the high-pressure fuel pipe 8 side is smaller than the predetermined value with respect to the discharge valve 75, and the flow of the fuel in the discharge passage 705 is restricted.

The relief valve 91 in the discharge passage 705 is open when a differential pressure between the fuel on the high-pressure fuel pipe 8 side and the fuel on the pressure chamber 200 side is equal to or larger than a predetermined value with respect to the relief valve 91, and the flow of the fuel in the discharge passage 705 is permitted. On the other hand, the relief valve 91 in the discharge passage 705 is closed when the differential pressure between the fuel on the high-pressure fuel pipe 8 side and the fuel on the pressure chamber 200 side is smaller than the predetermined value with respect to the relief valve 91, and the flow of fuel in the discharge passage 705 is restricted.

When a pressure of the fuel on the high-pressure fuel pipe 8 side rises to an abnormal value with respect to the relief valve 91 in the discharge passage 705, the relief valve 91 is open. Therefore, the fuel on the high-pressure fuel pipe 8 side with respect to the relief valve 91 in the discharge passage 705 is returned to the pressure chamber 200 side. By operating the relief valve 91, the pressure of the fuel on the high-pressure fuel pipe 8 side can be prevented from becoming an abnormal value.

In the present embodiment, the high-pressure pump 10 further includes a pulsation damper 15. The pulsation damper 15 is provided by, for example, combining two circular disk-shaped metal thin plates and joining outer edge portions thereof by welding. The inside of the pulsation damper 15 is filled with a gas with a predetermined pressure, such as nitrogen or argon. The pulsation damper 15 is provided between the cover bottom portion 262 of the fuel chamber 260 and the upper housing 21.

Next, the attachment of the high-pressure pump 10 to the engine 1 will be described.

In the present embodiment, the high-pressure pump 10 is attached to the engine 1 such that the holder support portion 24 is inserted into the attachment hole portion 3 of the engine head 2 (see FIG. 1). The high-pressure pump 10 is fixed to the engine 1 by fixing the lower housing 22 to the engine head 2 with bolts. Here, the high-pressure pump 10 is attached to the engine 1 in a posture in which the axis Ax1 of the cylinder 23 extends in a vertical direction.

Next, the operation of the high-pressure pump 10 according to the present embodiment will be described.

"Intake Process"

When the supply of the electric power to the coil 60 of the electromagnetic drive portion 500 is stopped, the valve member 40 is urged toward the pressure chamber 200 by the spring 54 and the needle 53. Therefore, the valve member 40 is separated from the valve seat 310, that is, is open. In this state, when the plunger 11 moves toward the side opposite to the pressure chamber 200, the capacity of the pressure chamber 200 increases, and the fuel on the side opposite to the pressure chamber 200 with respect to the valve seat 310, that is, the fuel chamber 260 side, is sucked toward the pressure chamber 200 through the communication passage 32.

"Amount Adjustment Process"

When the plunger 11 moves toward the pressure chamber 200 with the valve member 40 opened, the capacity of the pressure chamber 200 decreases, and the fuel on the pressure chamber 200 side with respect to the valve seat 310 is returned toward the fuel chamber 260 with respect to the valve seat 310. When the electric power is supplied to the coil 60 during an amount adjustment process, the movable core 55 is attracted toward the fixed core 57 together with the needle 53, and the valve member 40 is urged by the spring 39, comes into contact with the valve seat 310, and is closed. When the plunger 11 moves toward the pressure chamber 200, the amount of the fuel returned from the pressure chamber 200 toward the fuel chamber 260 is adjusted by closing the valve member 40. As a result, the amount of the fuel to be pressurized in the pressure chamber 200 is determined. When the valve member 40 is closed, the amount adjustment process of adjusting the amount of the fuel returned the fuel from the pressure chamber 200 toward the fuel chamber 260 is completed.

When the fuel injection valve does not inject fuel, that is, during fuel cut, the coil 60 is not energized, and the discharge amount of the fuel from the high-pressure pump 10 is 0. At this time, since the valve member 40 is open, the fuel in the pressure chamber 200 moves back and forth between the pressure chamber 200 and the fuel chamber 260 as the plunger 11 reciprocates.

"Pressurizing Process"

When the plunger 11 further moves toward the pressure chamber 200 with the valve member 40 closed, the capacity of the pressure chamber 200 decreases, and the fuel in the pressure chamber 200 is compressed and pressurized. When the pressure of the fuel in the pressure chamber 200 is equal to or higher than a valve opening pressure of the discharge valve 75, the discharge valve 75 opens, and the fuel is discharged from the pressure chamber 200 toward the high-pressure fuel pipe 8, that is, toward the fuel rail.

When the supply of the electric power to the coil 60 is stopped and the plunger 11 moves to the side opposite to the pressure chamber 200, the valve member 40 opens again.

Accordingly, the pressurizing process of pressurizing the fuel is completed, and the intake process of sucking the fuel from the fuel chamber 260 toward the pressure chamber 200 is restarted.

By repeating the "intake process", the "amount adjustment process", and the "pressurizing process", the high-pressure pump 10 pressurizes the fuel in the fuel chamber 260 sucked into the pressure chamber 200 and discharges and supplies the pressurized fuel to the fuel rail. The amount of the fuel supplied from the high-pressure pump 10 to the fuel rail is adjusted by controlling a timing of supplying the electric power to the coil 60 of the electromagnetic drive portion 500 or the like.

When the plunger 11 reciprocates while the valve member 40 is open in the "intake process", the "amount adjustment process", and the like, pressure pulsation caused by the increase or decrease in the capacity of the pressure chamber 200 may occur in the fuel in the fuel chamber 260. The pulsation damper 15 provided in the fuel chamber 260 can reduce the pressure pulsation of the fuel in the fuel chamber 260 by being elastically deformed according to a change in the fuel pressure in the fuel chamber 260.

When the plunger 11 is reciprocating, the pressure pulsation caused by an increase or decrease in the capacity of the variable capacity chamber 201 may occur. In this case, the pulsation damper 15 can also reduce the pressure pulsation of the fuel in the fuel chamber 260 by being elastically deformed according to the change in the fuel pressure in the fuel chamber 260.

When the plunger 11 descends, the capacity of the variable capacity chamber 201 decreases following a descending speed of the plunger 11, and the fuel is pushed out toward the fuel chamber 260. As a result, the fuel in the fuel chamber 260 is easily introduced into the pressure chamber 200 when the plunger 11 descends. In addition, when the plunger 11 rises, the capacity of the variable capacity chamber 201 increases, and thus the fuel returned from the pressure chamber 200 during the amount adjustment is easily discharged to the variable capacity chamber 201. Due to the above operation, the pulsation of the fuel chamber 260 is reduced.

When the plunger 11 reciprocates, the capacity of the variable capacity chamber 201 increases or decreases, and thus the fuel moves back and forth between the fuel chamber 260 and the annular space 202 and between the fuel chamber 260 and the variable capacity chamber 201. Accordingly, the cylinder 23 and the plunger 11, which are heated to a high temperature by heat generated by sliding between the plunger 11 and the cylinder 23 and heat generated by the pressurization of the fuel in the pressure chamber 200, can be cooled by low-temperature fuel. Accordingly, seizure of the plunger 11 and the cylinder 23 can be reduced.

A part of the fuel pressurized in the pressure chamber 200 flows into the variable capacity chamber 201 through a clearance between the plunger 11 and the cylinder 23. Accordingly, an oil film is provided between the plunger 11 and the cylinder 23, and the seizure of the plunger 11 and the cylinder 23 can be effectively prevented. The fuel that has flowed from the pressure chamber 200 into the variable capacity chamber 201 returns to the fuel chamber 260 through the annular space 202.

In the present embodiment, the high-pressure pump 10 is attached to the engine 1 and is then for use. Therefore, the lower housing 22, the upper housing 21, and the like of the high-pressure pump 10 vibrate due to the vibration of the engine 1 and the vibration of the high-pressure pump 10 during operation, and the cylinder member 51 of the first electromagnetic drive portion 501 connected to the upper housing 21 also vibrates. As a result, the vibration may be transmitted to the second electromagnetic drive portion 502 connected to the upper housing 21 via the cylinder member 51, and the terminal 651 of the coil sub-assembly 650 may vibrate.

However, in the present embodiment, when assembling the first electromagnetic drive portion 501 and the second electromagnetic drive portion 502, the O-ring 671 as the "second connection portion" is sandwiched between the first electromagnetic drive portion 501 and the second electromagnetic drive portion 502, and close contact is made such that no gap can be formed after assembly. In addition, after the assembly, the yoke 645 of the second electromagnetic drive portion 502 and the fixed core 57 are connected to each other by the welded portion 661 as the "first connection portion", and the coil sub-assembly 650 of the second electromagnetic drive portion 502 and the cylinder member 51 are connected to each other by the O-ring 671 as the "second connection portion". Therefore, the vibration of the terminal 651 due to the vibration of the engine 1 and the vibration of the high-pressure pump 10 during operation can be reduced. Accordingly, wear of the terminal 651 can be reduced, and poor continuity can be reduced.

In the present embodiment, the yoke 641 and the yoke 645 that are exposed to the outside of the second electromagnetic drive portion 502 are each formed of a material having relatively high corrosion resistance. In addition, water or the like can be prevented from entering the fixed core 57 side from the outside through the O-ring 681, the welded portion 661 as the "first connection portion", and the O-ring 671 as the "second connection portion". Therefore, corrosion resistance of the yoke 641, the yoke 645, and the fixed core 57 can be improved.

In the present embodiment, the O-ring 671 as the "second connection portion" is provided in an annular space formed between the coil sub-assembly 650 and the cylinder member 51. Therefore, there is no need to change the yoke 641 and the yoke 645 as magnetic paths, and the influence on an attraction force can be reduced.

In the present embodiment, by filling the annular space between the coil sub-assembly 650 and the cylinder member 51 with the O-ring 671 as the "second connection portion", water or the like can be prevented from entering the electromagnetic drive portion 500, and the corrosion resistance of the fixed core 57 or the like can be improved.

As described above, in the present embodiment, the welded portion 661 as the "first connection portion" connects the second electromagnetic drive portion 502 and the fixed core 57 on the side of the second electromagnetic drive portion 502 as the "coil assembly" opposite to the pressure chamber 200. The O-ring 671 as the "second connection portion" connects the second electromagnetic drive portion 502 and the cylinder member 51 on the pressure chamber 200 side of the second electromagnetic drive portion 502.

In the present embodiment, the second electromagnetic drive portion 502 on the side opposite to the pressure chamber 200 is supported by the fixed core 57 via the welded portion 661, and the second electromagnetic drive portion 502 on the pressure chamber 200 side is supported by the cylinder member 51 via the O-ring 671. That is, both axial ends of the second electromagnetic drive portion 502 are supported by other portions (welded portion 661 and O-ring 671).

Therefore, when the high-pressure pump 10 is attached to the engine 1, the vibration of the second electromagnetic drive portion 502 due to the vibration of the engine 1 and the vibration of the high-pressure pump 10 during operation can be reduced. Accordingly, the vibration and the wear of the terminal 651 can be reduced, and the poor continuity can be reduced. As a result, operation malfunction of the intake valve portion 300 can be reduced, and the fuel discharge of the high-pressure pump 10 can be stabilized.

In the present embodiment, the cylinder member 51 and the yoke 641 as the "first yoke" form the magnetic path 505 by a part of the second cylinder portion 512 of the cylinder member 51 and a part of the yoke 641 that are adjacent to each other in the radial direction of the cylinder member 51. The O-ring 671 as the "second connection portion" is provided on a coil 60 side with respect to the magnetic path 505.

Accordingly, the vibration of the second electromagnetic drive portion 502 can be effectively reduced while ensuring a cross-sectional area of a magnetic circuit. In addition, water or the like can be prevented from entering the spool 61 from the outside of the electromagnetic drive portion 500 through the gap between the second cylinder portion 512 of the cylinder member 51 and the yoke hole portion 642 of the yoke 641. As a result, the fixed core 57 can be prevented from being corroded.

In the present embodiment, the yoke 641 as the "first yoke" includes the facing portion 643 facing the base portion 652 of the coil sub-assembly 650 in the axial direction of the coil 60. The O-ring 671 as the "second connection portion" is provided on the coil 60 side with respect to the facing portion 643.

Accordingly, water or the like can be prevented from entering the spool 61 from the outside of the electromagnetic drive portion 500 through a space between the yoke notch portion 648 and the base portion 652 of the coil sub-assembly 650 and the facing portion 643. As a result, the fixed core 57 can be effectively prevented from being corroded.

In the present embodiment, the O-ring 671 as the "second connection portion" is formed of an elastic member in an annular shape.

Therefore, the vibration of the second electromagnetic drive portion 502 due to the vibration of the engine 1 and the vibration of the high-pressure pump 10 during operation can be more effectively reduced. In addition, by the O-ring 671, the space between the second electromagnetic drive portion 502 and the cylinder member 51 can be kept liquid-tight, and the fixed core 57 or the like inside the space can be prevented from being corroded. Further, the O-ring 671 can reduce an operating noise of the electromagnetic drive portion 500.

Second Embodiment

Figure 6:
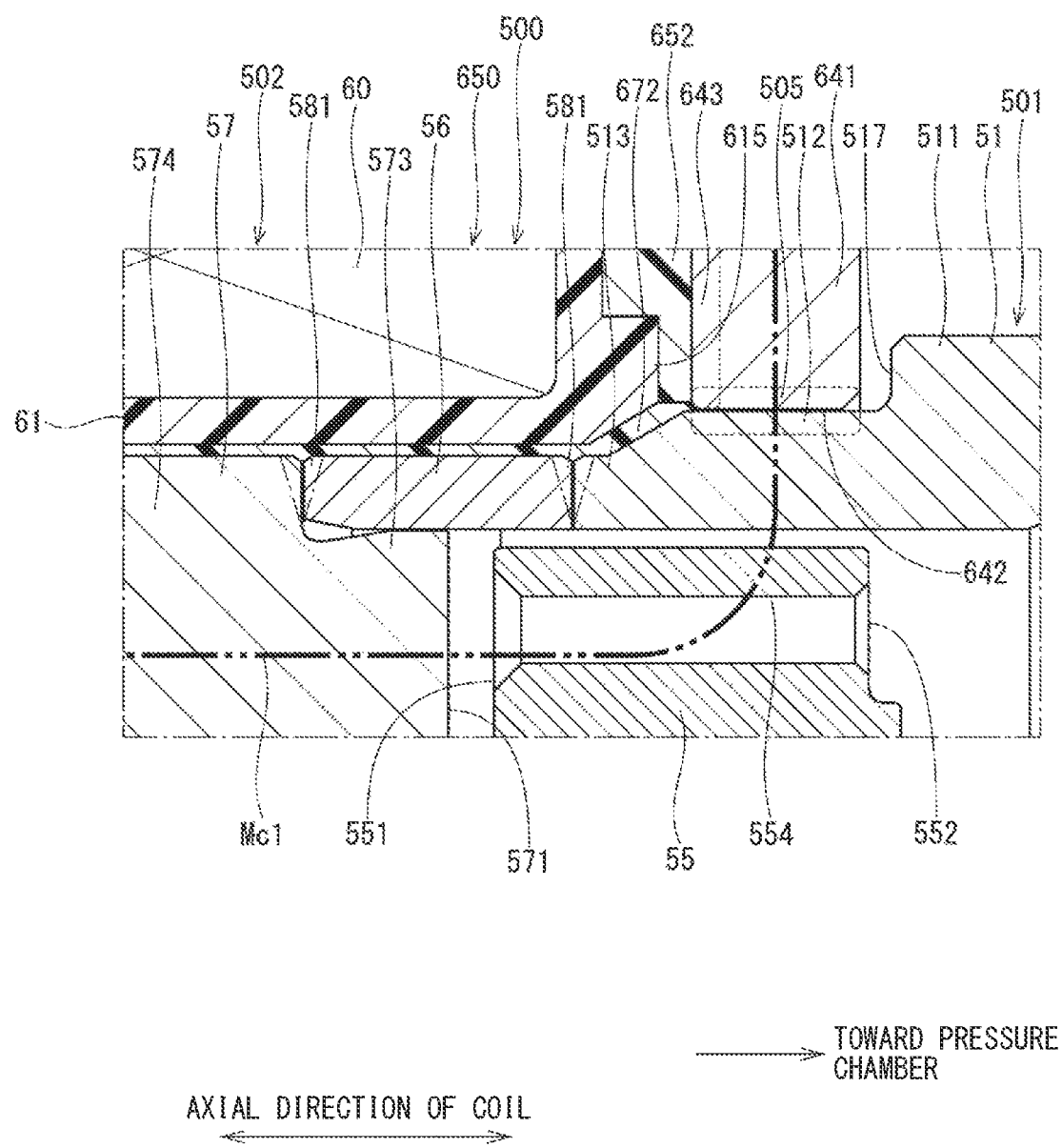
FIG. 6 is a cross-sectional view showing a part of a second connection portion and a vicinity thereof in a high-pressure pump according to a second embodiment.

FIG. 6 shows a part of a high-pressure pump according to a second embodiment. The second embodiment is different from the first embodiment in the configuration of the second connection portion or the like.

In the present embodiment, the outer peripheral wall of the third cylinder portion 513 of the cylinder member 51 on the second cylinder portion 512 side is formed in a tapered shape so as to approach the axis of the cylinder member 51 from the second cylinder portion 512 side toward the magnetic throttle portion 56.

The inner peripheral wall of the protruding portion 615 of the spool 61 is formed in a tapered shape so as to approach an axis of the spool 61 from the pressure chamber 200 side toward the side opposite to the pressure chamber 200.

According to the present embodiment, a coating portion 672 as the "second connection portion" is provided. The coating portion 672 is formed of an elastic member such as an adhesive, that is, a resin material having an elastic modulus of a predetermined value or less, and is formed in a cylindrical shape so as to cover outer peripheral walls of the third cylinder portion 513 of the cylinder member 51, the magnetic throttle portion 56, and the fixed core large diameter portion 574 of the fixed core 57 over the entire range in a circumferential direction.

An outer peripheral wall of the coating portion 672 is in contact with inner peripheral walls of the spool 61 and the base portion 652. Accordingly, the coating portion 672 connects the spool 61 and the base portion 652 of the second electromagnetic drive portion 502 as the "coil assembly" to the cylinder member 51, the magnetic throttle portion 56, and the fixed core 57. Therefore, the coating portion 672 connects the spool 61 and the base portion 652 to the cylinder member 51 on the pressure chamber 200 side of the second electromagnetic drive portion 502 as the "coil assembly".

Next, a method for assembling the first electromagnetic drive portion 501 and the second electromagnetic drive portion 502 will be described.

First, the coating portion 672 is provided so as to cover the outer peripheral walls of the third cylinder portion 513 of the cylinder member 51, the magnetic throttle portion 56, and the fixed core large diameter portion 574 of the fixed core 57 in the sub-assembled first electromagnetic drive portion 501 over the entire range in the circumferential direction. At this point, the coating portion 672 is not cured.

Subsequently, the fixed core 57 of the first electromagnetic drive portion 501 provided with the coating portion 672 is inserted into the yoke hole portion 642 and the spool 61 of the sub-assembled second electromagnetic drive portion 502. At this point, the coating portion 672 is also not cured, and the coating portion 672 is brought into close contact with the inner peripheral walls of the spool 61 and the base portion 652.

Subsequently, the end surface 572 of the fixed core 57 and the yoke bottom portion 646 are brought into contact with each other, and the fixed core 57 and the yoke bottom portion 646 are welded to form the welded portion 661. Accordingly, the assembly of the first electromagnetic drive portion 501 and the second electromagnetic drive portion 502 is completed.

When a predetermined time elapses after the fixed core 57 of the first electromagnetic drive portion 501 is inserted into the second electromagnetic drive portion 502, the coating portion 672 is cured by moisture. In the present embodiment, the coating portion 672 is formed of a material having elasticity even after being cured.

In the present embodiment, when assembling the first electromagnetic drive portion 501 and the second electromagnetic drive portion 502, the outer peripheral walls of the cylinder member 51, the magnetic throttle portion 56, and the fixed core 57 in the first electromagnetic drive portion 501 are coated with the coating portion 672 formed of a resin, and close contact is made such that no gap can be formed between the first electromagnetic drive portion 501 and the second electromagnetic drive portion 502 after assembly. In addition, after the assembly, the yoke 645 of the second electromagnetic drive portion 502 and the fixed core 57 are connected to each other by the welded portion 661 as the "first connection portion", and the coil sub-assembly 650 of the second electromagnetic drive portion 502 is connected to the cylinder member 51, the magnetic throttle portion 56, and the fixed core 57 by the coating portion 672 as the "second connection portion". Therefore, the vibration of the terminal 651 due to the vibration of the engine 1 and the vibration of the high-pressure pump 10 during operation can be reduced. Accordingly, wear of the terminal 651 can be reduced, and poor continuity can be reduced.

In the present embodiment, the coating portion 672 as the "second connection portion" is provided in a cylindrical space formed between the coil sub-assembly 650 and the cylinder member 51, the magnetic throttle portion 56, and the fixed core 57. Therefore, there is no need to change the yoke 641 and the yoke 645 as magnetic paths, and the influence on an attraction force can be reduced.

In the present embodiment, by filling the cylindrical space between the coil sub-assembly 650 and the cylinder member 51, the magnetic throttle portion 56, and the fixed core 57 with the coating portion 672 as the "second connection portion", water or the like can be prevented from entering the electromagnetic drive portion 500, and the corrosion resistance of the fixed core 57 or the like can be improved.

In the present embodiment, since the coating portion 672 as the "second connection portion" is formed in a cylindrical shape, a contact area between the coating portion 672 and the coil sub-assembly 650 of the second electromagnetic drive portion 502, the cylinder member 51 of the first electromagnetic drive portion 501, and the like can be easily increased. Therefore, the vibration of the terminal 651 due to the vibration of the engine 1 and the vibration of the high-pressure pump 10 during operation can be more effectively reduced.

As described above, in the present embodiment, the coating portion 672 as the "second connection portion" connects the second electromagnetic drive portion 502 and the cylinder member 51 on the pressure chamber 200 side of the second electromagnetic drive portion 502.

Therefore, as in the first embodiment, the vibration and the wear of the terminal 651 can be reduced, and the poor continuity can be reduced. As a result, operation malfunction of the intake valve portion 300 can be reduced, and the fuel discharge of the high-pressure pump 10 can be stabilized.

In the present embodiment, a part of the coating portion 672 as the "second connection portion" is provided on the coil 60 side with respect to the magnetic path 505.

In the present embodiment, a part of the coating portion 672 as the "second connection portion" is provided on the coil 60 side with respect to the facing portion 643.

Therefore, as in the first embodiment, the vibration of the second electromagnetic drive portion 502 can be effectively reduced while ensuring a cross-sectional area of a magnetic circuit. In addition, water or the like can be prevented from entering the spool 61 from the outside of the electromagnetic drive portion 500. As a result, the fixed core 57 can be effectively prevented from being corroded.

In the present embodiment, the coating portion 672 as the "second connection portion" is formed of an elastic member in a cylindrical shape, that is, an annular shape.

Therefore, as in the first embodiment, the vibration of the second electromagnetic drive portion 502 due to the vibration of the engine 1 and the vibration of the high-pressure pump 10 during operation can be more effectively reduced. In addition, by the coating portion 672, the space between the second electromagnetic drive portion 502 and the cylinder member 51 can be kept liquid-tight, and the fixed core 57 or the like inside the space can be prevented from being corroded. Further, the coating portion 672 can reduce an operating noise of the electromagnetic drive portion 500.

Third Embodiment

Figure 7:
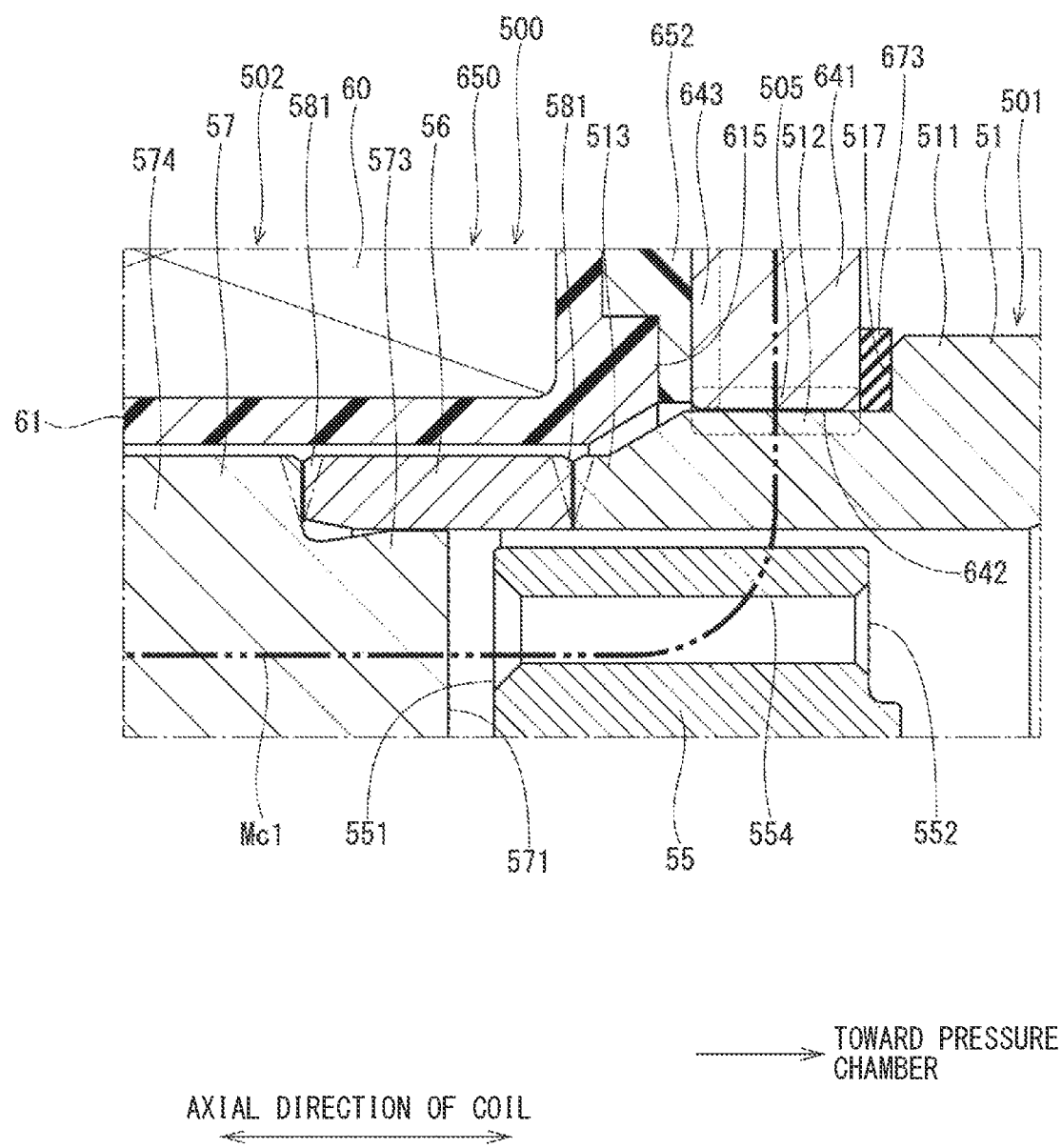
FIG. 7 is a cross-sectional view showing a second connection portion and a vicinity thereof in a high-pressure pump according to a third embodiment.

FIG. 7 shows a part of a high-pressure pump according to a third embodiment. The third embodiment is different from the second embodiment in the configuration of the second connection portion or the like.

In the present embodiment, a plate rubber 673 as the "second connection portion" is provided.

The plate rubber 673 is formed of an elastic member such as rubber, that is, a resin material having an elastic modulus of a predetermined value or less, in an annular plate shape.

The plate rubber 673 connects the second electromagnetic drive portion 502 and the cylinder member 51 on the pressure chamber 200 side of the second electromagnetic drive portion 502.

The plate rubber 673 is provided between the yoke 641 and the cylinder member 51 in the axial direction of the cylinder member 51.

More specifically, an inner diameter of the plate rubber 673 is substantially the same as the outer diameter of the second cylinder portion 512 of the cylinder member 51. The plate rubber 673 is provided between the step surface 517 and the surface of the yoke 641 on the pressure chamber 200 side in a radially outer side of the second cylinder portion 512 of the cylinder member 51.

The plate rubber 673 is sandwiched between the step surface 517 and the surface of the yoke 641 on the pressure chamber 200 side, and is axially compressed. Accordingly, a space between the step surface 517 of the cylinder member 51 and the yoke 641 is kept liquid-tight, and water or the like can be prevented from entering a space inside the electromagnetic drive portion 500 from the outside of the electromagnetic drive portion 500 through the space between the step surface 517 and the yoke 641.

Next, a method for assembling the first electromagnetic drive portion 501 and the second electromagnetic drive portion 502 will be described.

First, the plate rubber 673 is provided on the radially outer side of the second cylinder portion 512 of the cylinder member 51 of the sub-assembled first electromagnetic drive portion 501.

Subsequently, the fixed core 57 of the first electromagnetic drive portion 501 provided with the plate rubber 673 is inserted into the yoke hole portion 642 and the spool 61 of the sub-assembled second electromagnetic drive portion 502.

Subsequently, the end surface 572 of the fixed core 57 and the yoke bottom portion 646 are brought into contact with each other, and the fixed core 57 and the yoke bottom portion 646 are welded to form the welded portion 661. Accordingly, the assembly of the first electromagnetic drive portion 501 and the second electromagnetic drive portion 502 is completed.

After the first electromagnetic drive portion 501 and the second electromagnetic drive portion 502 are assembled, the plate rubber 673 is axially compressed.

In the present embodiment, when assembling the first electromagnetic drive portion 501 and the second electromagnetic drive portion 502, the plate rubber 673 as the "second connection portion" is sandwiched between the step surface 517 of the cylinder member 51 of the first electromagnetic drive portion 501 and the yoke 641 of the second electromagnetic drive portion 502, and close contact is made such that no gap can be formed in the axial direction of the cylinder member 51. In addition, after the assembly, the yoke 645 of the second electromagnetic drive portion 502 and the fixed core 57 are connected to each other by the welded portion 661 as the "first connection portion", and the yoke 641 of the second electromagnetic drive portion 502 and the cylinder member 51 are connected to each other by the plate rubber 673 as the "second connection portion".

Therefore, the vibration of the terminal 651 due to the vibration of the engine 1 and the vibration of the high-pressure pump 10 during operation can be reduced. Accordingly, wear of the terminal 651 can be reduced, and poor continuity can be reduced.

In the present embodiment, the plate rubber 673 as the "second connection portion" is provided in the annular gap formed between the yoke 641 and the step surface 517 of the cylinder member 51. Therefore, there is no need to change the yoke 641 and the yoke 645 as magnetic paths, and the influence on an attraction force can be reduced.

In the present embodiment, by filling the annular gap between the yoke 641 and the step surface 517 of the cylinder member 51 with the plate rubber 673 as the "second connection portion", water or the like can be prevented from entering the electromagnetic drive portion 500, and the corrosion resistance of the fixed core 57 or the like can be improved.

In the present embodiment, the plate rubber 673 as the "second connection portion" is provided at a position visible from the outside. Therefore, the occurrence of shortages and process omissions can be reduced.

As described above, in the present embodiment, the plate rubber 673 as the "second connection portion" connects the second electromagnetic drive portion 502 and the cylinder member 51 on the pressure chamber 200 side of the second electromagnetic drive portion 502.

Therefore, as in the second embodiment, the vibration and the wear of the terminal 651 can be reduced, and the poor continuity can be reduced. As a result, operation malfunction of the intake valve portion 300 can be reduced, and the fuel discharge of the high-pressure pump 10 can be stabilized.

In the present embodiment, the plate rubber 673 as the "second connection portion" is provided between the yoke 641 as the "first yoke" and the cylinder member 51 in the axial direction of the cylinder member 51.

Accordingly, the vibration of the second electromagnetic drive portion 502 can be effectively reduced while ensuring a cross-sectional area of a magnetic circuit. In addition, water or the like can be prevented from entering the electromagnetic drive portion 500 from the outside of the electromagnetic drive portion 500. As a result, the fixed core 57 or the like can be prevented from being corroded.

In the present embodiment, the plate rubber 673 as the "second connection portion" is formed of an elastic member in an annular shape.

Therefore, as in the second embodiment, the vibration of the second electromagnetic drive portion 502 due to the vibration of the engine 1 and the vibration of the high-pressure pump 10 during operation can be more effectively reduced. In addition, by the plate rubber 673, the space between the second electromagnetic drive portion 502 and the cylinder member 51 can be kept liquid-tight, and the fixed core 57 or the like inside the space can be prevented from being corroded. Further, the plate rubber 673 can reduce an operating noise of the electromagnetic drive portion 500.

Fourth Embodiment

Figure 8:
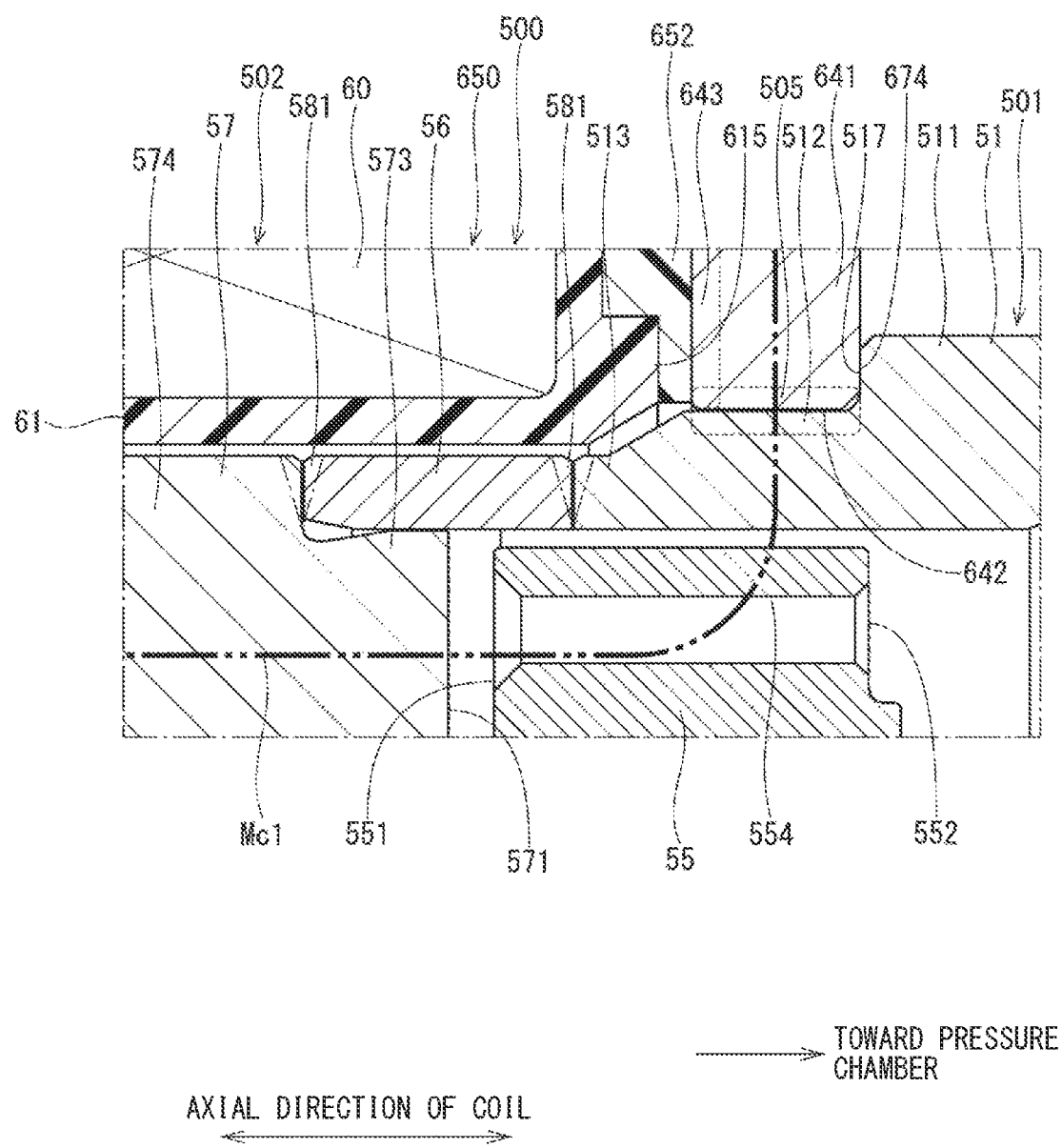
FIG. 8 is a cross-sectional view showing a second connection portion and a vicinity thereof in a high-pressure pump according to a fourth embodiment.

FIG. 8 shows a part of a high-pressure pump according to a fourth embodiment. The fourth embodiment is different from the third embodiment in the configuration of the second connection portion or the like.

In the present embodiment, a contact surface 674 as the "second connection portion" is provided.

The contact surface 674 is provided between the yoke 641 and the cylinder member 51 in the axial direction of the cylinder member 51.

More specifically, the contact surface 674 is a contact surface between the yoke 641 and the step surface 517 of the cylinder member 51 in the axial direction of the cylinder member 51, and is formed in an annular shape.

More specifically, the contact surface 674 is a contact surface between the surface of the yoke 641 on the pressure chamber 200 side and the step surface 517 of the cylinder member 51 in the axial direction of the cylinder member 51, and is formed in an annular planar shape.

The contact surface 674 connects the surface of the yoke 641 on the pressure chamber 200 side and the step surface 517 of the cylinder member 51.

That is, the contact surface 674 connects the second electromagnetic drive portion 502 and the cylinder member 51 on the pressure chamber 200 side of the second electromagnetic drive portion 502.

An axial force having a predetermined magnitude along the axial direction of the cylinder member 51 is applied to the contact surface 674. Accordingly, a space between the step surface 517 of the cylinder member 51 and the yoke 641 is kept liquid-tight, and water or the like can be prevented from entering a space inside the electromagnetic drive portion 500 from the outside of the electromagnetic drive portion 500 through the space between the step surface 517 and the yoke 641.

Next, a method for assembling the first electromagnetic drive portion 501 and the second electromagnetic drive portion 502 will be described.

First, the fixed core 57 of the sub-assembled first electromagnetic drive portion 501 is inserted into the yoke hole portion 642 and the spool 61 of the sub-assembled second electromagnetic drive portion 502.

Subsequently, the step surface 517 of the cylinder member 51 and the surface of the yoke 641 on the pressure chamber 200 side are brought into contact with each other, and the first electromagnetic drive portion 501 is further pushed into the second electromagnetic drive portion 502.

Subsequently, the end surface 572 of the fixed core 57 and the yoke bottom portion 646 are brought into contact with each other, and the fixed core 57 and the yoke bottom portion 646 are welded to form the welded portion 661. Accordingly, the assembly of the first electromagnetic drive portion 501 and the second electromagnetic drive portion 502 is completed.

After the first electromagnetic drive portion 501 and the second electromagnetic drive portion 502 are assembled, the axial force having a predetermined magnitude along the axial direction of the cylinder member 51 is applied to the contact surface 674.

In the present embodiment, when assembling the first electromagnetic drive portion 501 and the second electromagnetic drive portion 502, the step surface 517 of the cylinder member 51 of the first electromagnetic drive portion 501 and the yoke 641 of the second electromagnetic drive portion 502 are brought into contact with each other, and close contact is made such that no gap is formed in the axial direction of the cylinder member 51, thereby forming the annular contact surface 674. In addition, after the assembly, the yoke 645 of the second electromagnetic drive portion 502 is connected to the fixed core 57 by the welded portion 661 as the "first connection portion", and the yoke 641 of the second electromagnetic drive portion 502 is connected to the cylinder member 51 by the contact surface 674 as the "second connection portion". Therefore, the vibration of the terminal 651 due to the vibration of the engine 1 and the vibration of the high-pressure pump 10 during operation can be reduced. Accordingly, wear of the terminal 651 can be reduced, and poor continuity can be reduced.

In the present embodiment, by filling the annular gap between the yoke 641 and the step surface 517 of the cylinder member 51 with the contact surface 674 as the "second connection portion", that is, by eliminating the gap, water or the like can be prevented from entering the electromagnetic drive portion 500, and corrosion resistance of the fixed core 57 or the like can be improved.

In the present embodiment, as in the first to third embodiments, the number of components can be reduced without requiring a separate component as the "second connection portion".

As described above, in the present embodiment, the contact surface 674 as the "second connection portion" connects the second electromagnetic drive portion 502 and the cylinder member 51 on the pressure chamber 200 side of the second electromagnetic drive portion 502.

Therefore, as in the third embodiment, the vibration and the wear of the terminal 651 can be reduced, and the poor continuity can be reduced. As a result, operation malfunction of the intake valve portion 300 can be reduced, and the fuel discharge of the high-pressure pump 10 can be stabilized.

In the present embodiment, the contact surface 674 as the "second connection portion" is provided between the yoke 641 as the "first yoke" and the cylinder member 51 in the axial direction of the cylinder member 51.

Accordingly, the vibration of the second electromagnetic drive portion 502 can be effectively reduced while ensuring a cross-sectional area of a magnetic circuit. In addition, water or the like can be prevented from entering the electromagnetic drive portion 500 from the outside of the electromagnetic drive portion 500. As a result, the fixed core 57 or the like can be prevented from being corroded.

In the present embodiment, the contact surface 674 as the "second connection portion" is a contact surface between the cylinder member 51 and the yoke 641 as the "first yoke" in the axial direction of the cylinder member 51 and is formed in an annular shape.

Therefore, the vibration of the second electromagnetic drive portion 502 can be more effectively reduced. In addition, water or the like can be more effectively prevented from entering the electromagnetic drive portion 500 from the outside of the electromagnetic drive portion 500.

Fifth Embodiment

Figure 9:
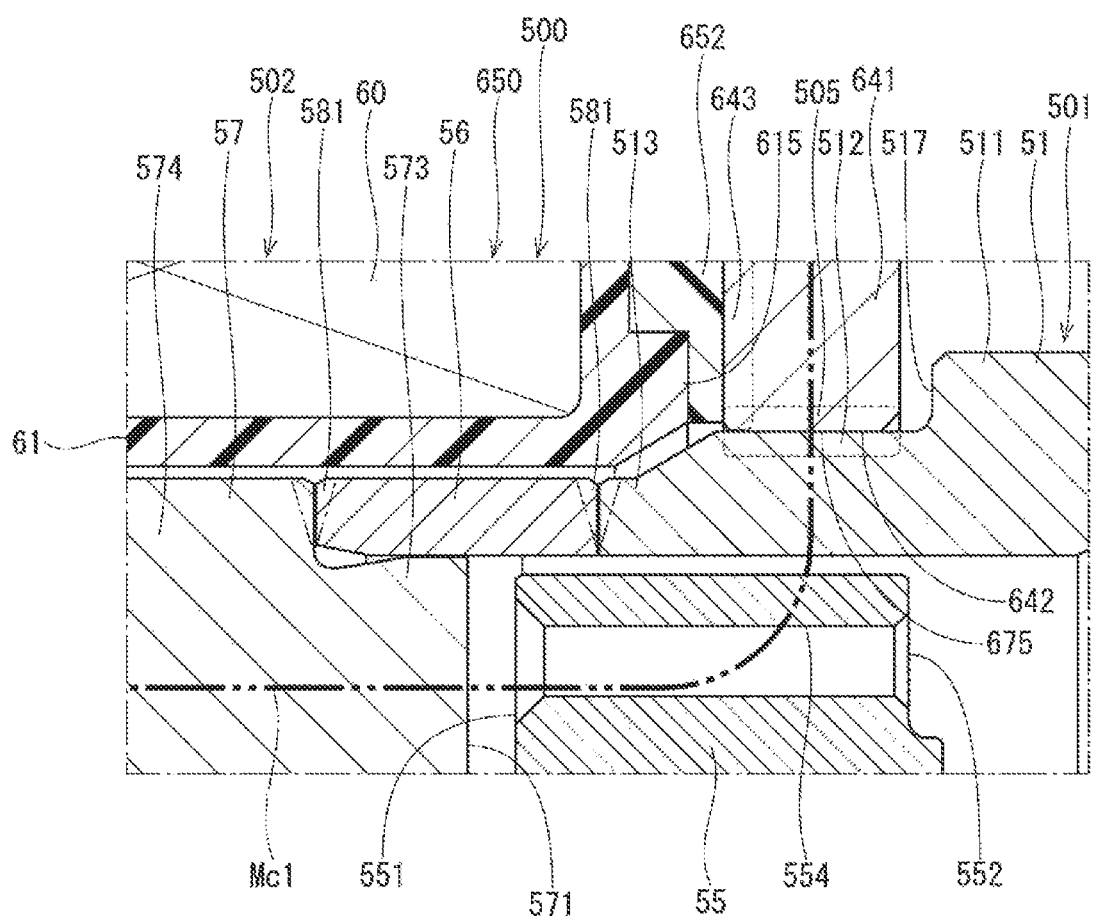
FIG. 9 is a cross-sectional view showing a second connection portion and a vicinity thereof in a high-pressure pump according to a fifth embodiment.

FIG. 9 shows a part of a high-pressure pump according to a fifth embodiment. The fifth embodiment is different from the third embodiment in the configuration of the second connection portion or the like.

In the present embodiment, the outer diameter of the second cylinder portion 512 of the cylinder member 51 is larger than the inner diameter of the yoke hole portion 642 of the yoke 641. The second cylinder portion 512 of the cylinder member 51 is press-fitted into the yoke hole portion 642.

In the present embodiment, a contact surface 675 as the "second connection portion" is provided.

The contact surface 675 is a contact surface between the yoke 641 and the cylinder member 51 in the radial direction of the cylinder member 51, and is formed in an annular shape.

More specifically, the contact surface 675 is a contact surface between an inner peripheral wall of the yoke hole portion 642 of the yoke 641 and an outer peripheral wall of the second cylinder portion 512 of the cylinder member 51 in the radial direction of the cylinder member 51, and is formed in a cylindrical shape.

The contact surface 675 connects the inner peripheral wall of the yoke hole portion 642 of the yoke 641 and the outer peripheral wall of the second cylinder portion 512 of the cylinder member 51.

That is, the contact surface 675 connects the second electromagnetic drive portion 502 and the cylinder member 51 on the pressure chamber 200 side of the second electromagnetic drive portion 502.

A force having a predetermined magnitude along the radial direction of the cylinder member 51 is applied to the contact surface 675. Accordingly, a space between the outer peripheral wall of the second cylinder portion 512 of the cylinder member 51 and the inner peripheral wall of the yoke hole portion 642 of the yoke 641 is kept liquid-tight, and water or the like can be prevented from entering the space inside the electromagnetic drive portion 500 from the outside of the electromagnetic drive portion 500 through a space between the cylinder member 51 and the yoke 641.

Next, a method for assembling the first electromagnetic drive portion 501 and the second electromagnetic drive portion 502 will be described.

First, the fixed core 57 of the sub-assembled first electromagnetic drive portion 501 is inserted into the yoke hole portion 642 and the spool 61 of the sub-assembled second electromagnetic drive portion 502.

Subsequently, the outer peripheral wall of the second cylinder portion 512 of the cylinder member 51 and the inner peripheral wall of the yoke hole portion 642 of the yoke 641 are brought into contact with each other and slid with each other by press fitting, and the first electromagnetic drive portion 501 is pushed into the second electromagnetic drive portion 502.

Subsequently, the end surface 572 of the fixed core 57 and the yoke bottom portion 646 are brought into contact with each other, and the fixed core 57 and the yoke bottom portion 646 are welded to form the welded portion 661. Accordingly, the assembly of the first electromagnetic drive portion 501 and the second electromagnetic drive portion 502 is completed.

After the first electromagnetic drive portion 501 and the second electromagnetic drive portion 502 are assembled, the force having a predetermined magnitude along the radial direction of the cylinder member 51 is applied to the contact surface 675.

In the present embodiment, when assembling the first electromagnetic drive portion 501 and the second electromagnetic drive portion 502, the second cylinder portion 512 of the cylinder member 51 of the first electromagnetic drive portion 501 is press-fitted into the yoke hole portion 642 of the yoke 641 of the second electromagnetic drive portion 502, and close contact is made such that no gap can be formed between the outer peripheral wall of the second cylinder portion 512 and the inner peripheral wall of the yoke hole portion 642 in the radial direction of the cylinder member 51, thereby forming the cylindrical contact surface 675. In addition, after the assembly, the yoke 645 of the second electromagnetic drive portion 502 is connected to the fixed core 57 by the welded portion 661 as the "first connection portion", and the yoke 641 of the second electromagnetic drive portion 502 is connected to the cylinder member 51 by the contact surface 675 as the "second connection portion". Therefore, the vibration of the terminal 651 due to the vibration of the engine 1 and the vibration of the high-pressure pump 10 during operation can be reduced. Accordingly, wear of the terminal 651 can be reduced, and poor continuity can be reduced.

In the present embodiment, the contact surface 675 as the "second connection portion" is provided between the inner peripheral wall of the yoke hole portion 642 of the yoke 641 and the outer peripheral wall of the second cylinder portion 512 of the cylinder member 51. Therefore, there is no need to change the yoke 641 and the yoke 645 as magnetic paths, and the influence on an attraction force can be reduced.

In the present embodiment, by filling a cylindrical gap between the yoke hole portion 642 of the yoke 641 and the second cylinder portion 512 of the cylinder member 51 with the contact surface 675 as the "second connection portion", that is, by eliminating the gap, water or the like can be prevented from entering the electromagnetic drive portion 500, and corrosion resistance of the fixed core 57 or the like can be improved.

As described above, in the present embodiment, the contact surface 675 as the "second connection portion" connects the second electromagnetic drive portion 502 and the cylinder member 51 on the pressure chamber 200 side of the second electromagnetic drive portion 502.

Therefore, as in the third embodiment, the vibration and the wear of the terminal 651 can be reduced, and the poor continuity can be reduced. As a result, operation malfunction of the intake valve portion 300 can be reduced, and the fuel discharge of the high-pressure pump 10 can be stabilized.

In the present embodiment, the contact surface 675 as the "second connection portion" is a contact surface between the yoke 641 and the cylinder member 51 in the radial direction of the cylinder member 51 and is formed in an annular shape.

Accordingly, the vibration of the second electromagnetic drive portion 502 can be effectively reduced while ensuring a cross-sectional area of a magnetic circuit. In addition, water or the like can be prevented from entering the electromagnetic drive portion 500 from the outside of the electromagnetic drive portion 500. As a result, the fixed core 57 or the like can be prevented from being corroded.

Sixth Embodiment

Figure 10:
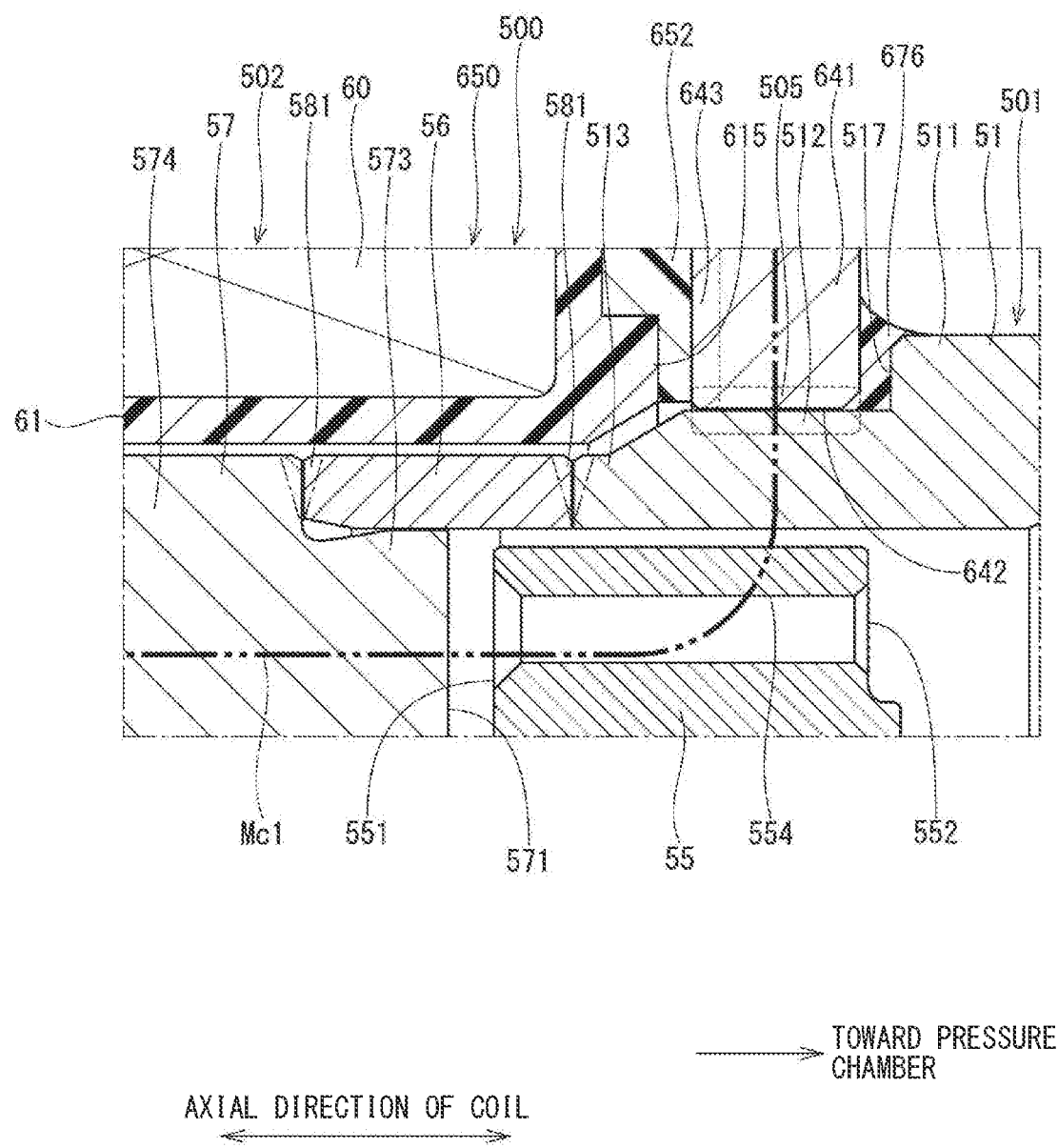
FIG. 10 is a cross-sectional view showing a second connection portion and a vicinity thereof in a high-pressure pump according to a sixth embodiment.

FIG. 10 shows a part of a high-pressure pump according to a sixth embodiment. The sixth embodiment is different from the third embodiment in the configuration of the second connection portion or the like.

In the present embodiment, a sealing portion 676 as the "second connection portion" is provided.

The sealing portion 676 is formed of an elastic member such as a resin, that is, a resin material having an elastic modulus of a predetermined value or less in an annular shape.

The sealing portion 676 connects the second electromagnetic drive portion 502 and the cylinder member 51 on the pressure chamber 200 side of the second electromagnetic drive portion 502.

The sealing portion 676 is provided between the yoke 641 and the cylinder member 51 in the axial direction of the cylinder member 51.

More specifically, the sealing portion 676 is provided between the step surface 517 and the surface of the yoke 641 on the pressure chamber 200 side on the radially outer side of the second cylinder portion 512 of the cylinder member 51.

The sealing portion 676 is provided on a radially outer side of the cylinder member 51 so as to seal the annular gap between the step surface 517 and the surface of the yoke 641 on the pressure chamber 200 side. Accordingly, a space between the step surface 517 of the cylinder member 51 and the yoke 641 is kept liquid-tight, and water or the like can be prevented from entering a space inside the electromagnetic drive portion 500 from the outside of the electromagnetic drive portion 500 through the space between the step surface 517 and the yoke 641.

Next, a method for assembling the first electromagnetic drive portion 501 and the second electromagnetic drive portion 502 will be described.

First, the fixed core 57 of the sub-assembled first electromagnetic drive portion 501 is inserted into the yoke hole portion 642 and the spool 61 of the sub-assembled second electromagnetic drive portion 502.

Subsequently, the end surface 572 of the fixed core 57 and the yoke bottom portion 646 are brought into contact with each other, and the fixed core 57 and the yoke bottom portion 646 are welded to form the welded portion 661.

Subsequently, the annular gap between the step surface 517 and the surface of the yoke 641 on the pressure chamber 200 side is sealed by the sealing portion 676. Specifically, the gap is filled with a melted resin material and the melted resin material is cooled and solidified to form the sealing portion 676. Accordingly, the assembly of the first electromagnetic drive portion 501 and the second electromagnetic drive portion 502 is completed.

After the first electromagnetic drive portion 501 and the second electromagnetic drive portion 502 are assembled, the sealing portion 676 has elasticity.

In the present embodiment, when assembling the first electromagnetic drive portion 501 and the second electromagnetic drive portion 502, the sealing portion 676 as the "second connection portion" is provided between the step surface 517 of the cylinder member 51 of the first electromagnetic drive portion 501 and the yoke 641 of the second electromagnetic drive portion 502, and close contact is made such that no gap can be formed in the axial direction of the cylinder member 51. In addition, after the assembly, the yoke 645 of the second electromagnetic drive portion 502 is connected to the fixed core 57 by the welded portion 661 as the "first connection portion", and the yoke 641 of the second electromagnetic drive portion 502 is connected to the cylinder member 51 by the sealing portion 676 as the "second connection portion". Therefore, the vibration of the terminal 651 due to the vibration of the engine 1 and the vibration of the high-pressure pump 10 during operation can be reduced. Accordingly, wear of the terminal 651 can be reduced, and poor continuity can be reduced.

In the present embodiment, the sealing portion 676 as the "second connection portion" is provided in the annular gap formed between the yoke 641 and the step surface 517 of the cylinder member 51. Therefore, there is no need to change the yoke 641 and the yoke 645 as magnetic paths, and the influence on an attraction force can be reduced.

In the present embodiment, by filling the annular gap between the yoke 641 and the step surface 517 of the cylinder member 51 with the sealing portion 676 as the "second connection portion", water or the like can be prevented from entering the electromagnetic drive portion 500, and corrosion resistance of the fixed core 57 or the like can be improved.

In the present embodiment, the sealing portion 676 as the "second connection portion" is provided at a position visible from the outside. Therefore, the occurrence of shortages and process omissions can be reduced.

As described above, in the present embodiment, the sealing portion 676 as the "second connection portion" connects the second electromagnetic drive portion 502 and the cylinder member 51 on the pressure chamber 200 side of the second electromagnetic drive portion 502.

Therefore, as in the third embodiment, the vibration and the wear of the terminal 651 can be reduced, and the poor continuity can be reduced. As a result, operation malfunction of the intake valve portion 300 can be reduced, and the fuel discharge of the high-pressure pump 10 can be stabilized.

In the present embodiment, the sealing portion 676 as the "second connection portion" is provided between the yoke 641 as the "first yoke" and the cylinder member 51 in the axial direction of the cylinder member 51.

Accordingly, the vibration of the second electromagnetic drive portion 502 can be effectively reduced while ensuring a cross-sectional area of a magnetic circuit. In addition, water or the like can be prevented from entering the electromagnetic drive portion 500 from the outside of the electromagnetic drive portion 500. As a result, the fixed core 57 or the like can be prevented from being corroded.

In the present embodiment, the sealing portion 676 as the "second connection portion" is formed of an elastic member in an annular shape.

Therefore, as in the third embodiment, the vibration of the second electromagnetic drive portion 502 due to the vibration of the engine 1 and the vibration of the high-pressure pump 10 during operation can be more effectively reduced. In addition, by the sealing portion 676, the space between the second electromagnetic drive portion 502 and the cylinder member 51 can be kept liquid-tight, and the fixed core 57 or the like inside the space can be prevented from being corroded. Further, the sealing portion 676 can reduce an operating noise of the electromagnetic drive portion 500.

Seventh Embodiment

Figure 11:
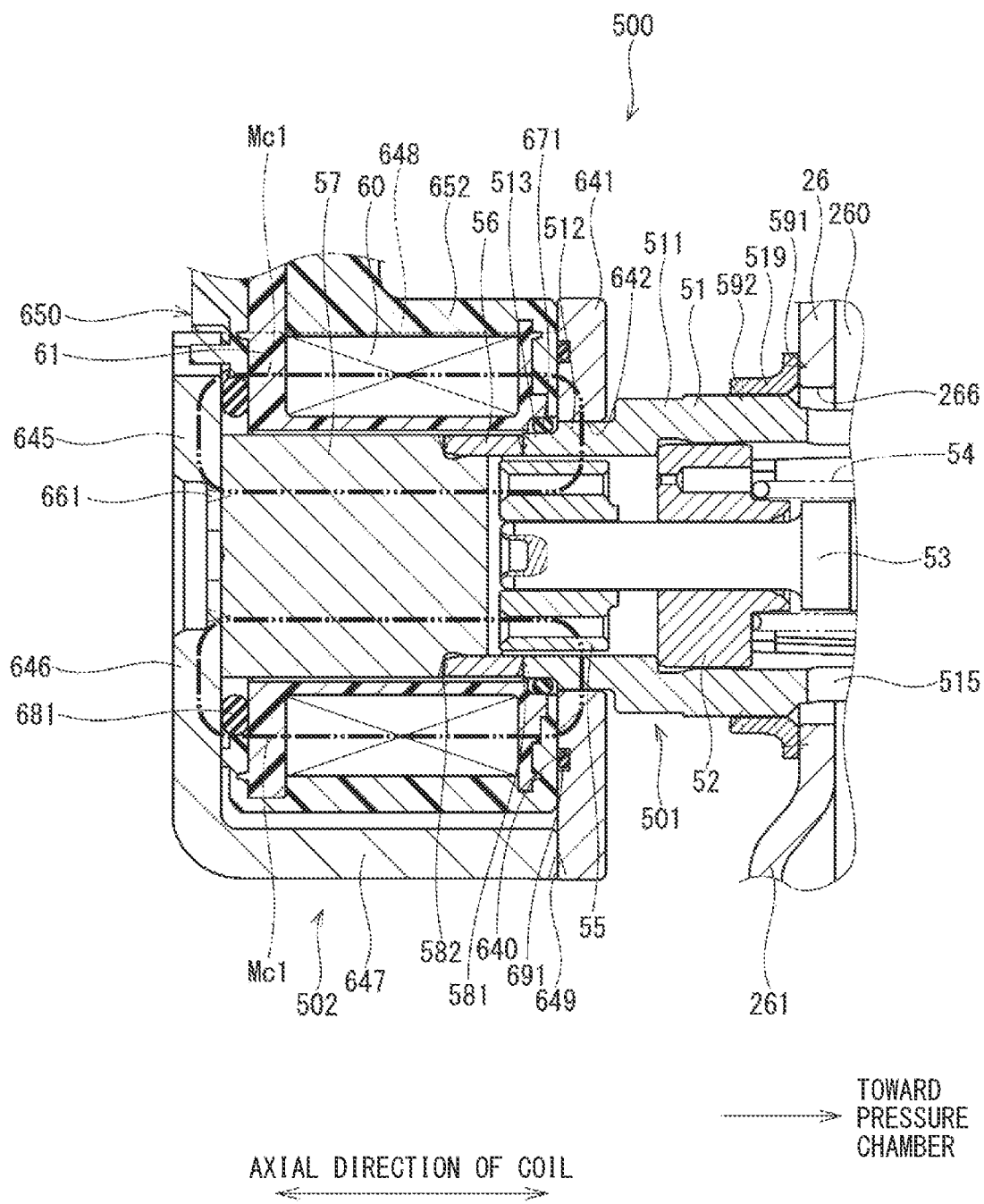
FIG. 11 is a cross-sectional view showing a part of an electromagnetic drive portion of a high-pressure pump according to a seventh embodiment.

FIG. 11 shows a part of a high-pressure pump according to a seventh embodiment. The seventh embodiment is different from the first embodiment in that a "third connection portion" is further provided.

In the present embodiment, an O-ring 691 as the "third connection portion" is further provided. The O-ring 691 connects the yoke 641 as the "first yoke" and the base portion 652 as the "resin portion".

More specifically, the O-ring 691 is provided in a seal groove portion 640 formed in the yoke 641. The seal groove portion 640 is formed so as to be recessed in an annular shape from a surface of the yoke 641 on a base portion 652 side.

The O-ring 691 is formed of an elastic member such as rubber, that is, a resin material having an elastic modulus of a predetermined value or less in an annular shape. The O-ring 691 is sandwiched between a bottom surface of the seal groove portion 640 and a surface of the base portion 652 on the yoke 641 side, and is axially compressed. Accordingly, a space between the seal groove portion 640 of the yoke 641 and the surface of the base portion 652 on the yoke 641 side is kept liquid-tight.

As described above, in the present embodiment, the O-ring 691 as the "third connection portion" is further provided. The O-ring 691 connects the yoke 641 as the "first yoke" and the base portion 652 as the "resin portion". In addition, in the present embodiment, the O-ring 691 is formed of an elastic member.

In the present embodiment, the upper housing 21 of the high-pressure pump 10 vibrates due to the vibration of the engine 1, and the electromagnetic drive portion 500 fixed to the upper housing 21 also vibrates. In the present embodiment, the O-ring 691 as the "third connection portion" is additionally provided in the seal groove portion 640 formed in a contact portion between the base portion 652 of the coil sub-assembly 650 and the yoke 641, and the base portion 652 and the yoke 641 are brought into close contact with each other. Therefore, the vibration to be transmitted to the second electromagnetic drive portion 502 as the "coil assembly" can be reduced. Accordingly, the vibration and the wear of the terminal 651 can be reduced, and the poor continuity can be reduced. Therefore, operation malfunction of the intake valve portion 300 can be reduced, and the fuel discharge of the high-pressure pump 10 can be further stabilized.

When a gap is formed in the contact portion between the base portion 652 of the coil sub-assembly 650 and the yoke 641, the gap may become a path for water to enter the fixed core 57 or the like inside the second electromagnetic drive portion 502 from the outside. In the present embodiment, by filling the contact portion between the base portion 652 of the coil sub-assembly 650 and the yoke 641 with the O-ring 691 as the "third connection portion", water can be prevented from entering the contact portion, and corrosion resistance of the fixed core 57 or the like can be further improved.

Eighth Embodiment

Figure 12:
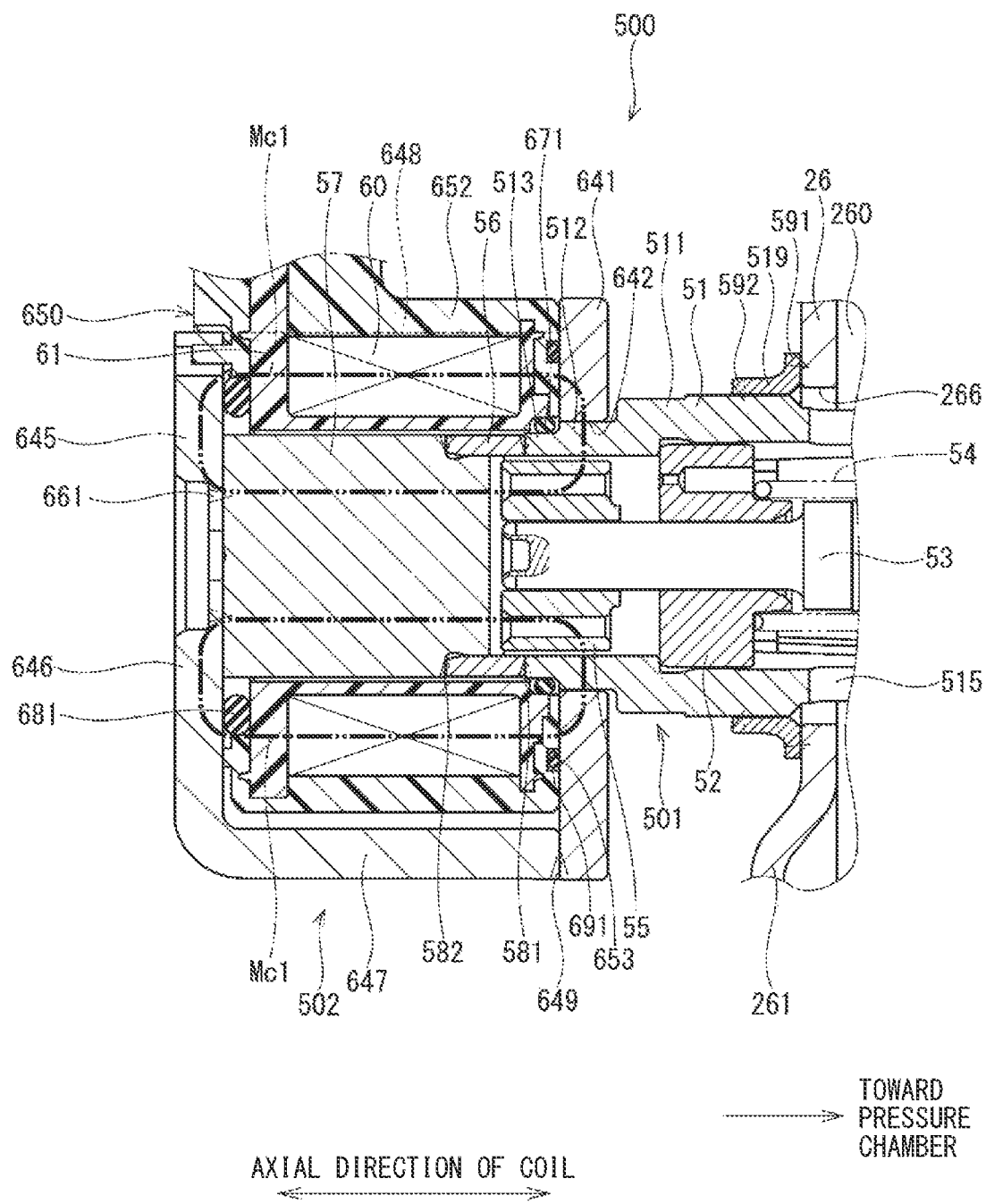
FIG. 12 is a cross-sectional view showing a part of an electromagnetic drive portion of a high-pressure pump according to an eighth embodiment.

FIG. 12 shows a part of a high-pressure pump according to an eighth embodiment. The eighth embodiment is different from the seventh embodiment in the arrangement of the "third connection portion" or the like.

In the present embodiment, no seal groove portion 640 is formed in the yoke 641. A seal groove portion 653 is formed in the base portion 652. The seal groove portion 653 is formed to be recessed in an annular shape from the surface of the base portion 652 on the yoke 641 side. The O-ring 691 as the "third connection portion" is provided in the seal groove portion 653.

The O-ring 691 is sandwiched between a bottom surface of the seal groove portion 653 and the surface of the yoke 641 on the base portion 652 side, and is axially compressed. Accordingly, a space between the seal groove portion 653 of the base portion 652 and the surface of the yoke 641 on the base portion 652 side is kept liquid-tight.

In the present embodiment, as in the seventh embodiment, the O-ring 691 as the "third connection portion" can prevent vibration and wear of the terminal 651 and prevent poor continuity. In addition, by filling the contact portion between the base portion 652 of the coil sub-assembly 650 and the yoke 641 with the O-ring 691 as the "third connection portion", water can be prevented from entering the contact portion.

In the present embodiment, as compared with the seventh embodiment, there is no change in a magnetic material for forming the seal groove portion 640 in the yoke 641 or the like, and thus the influence on an attraction force for the movable core 55 can be reduced.

Ninth Embodiment

Figure 13:
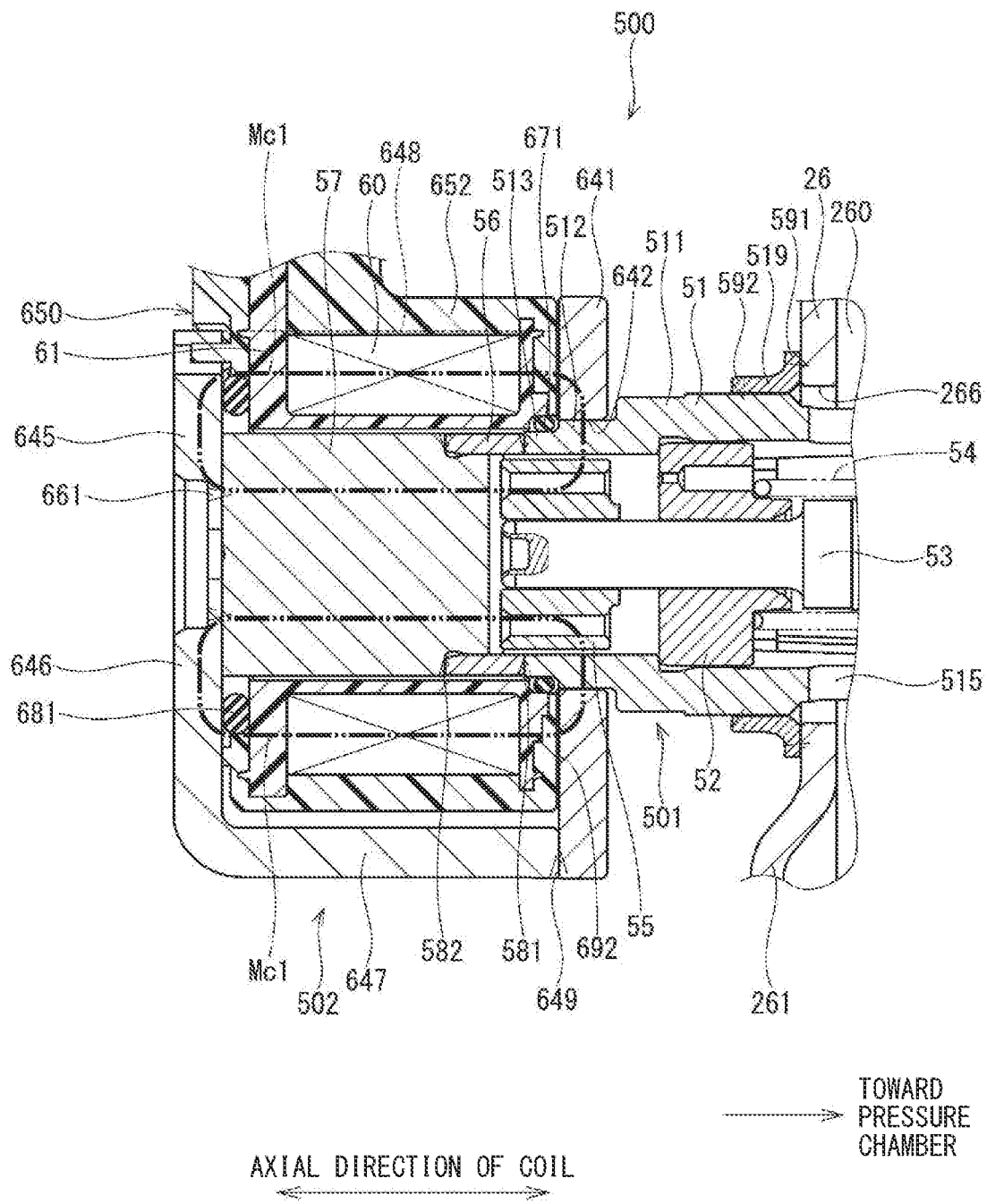
FIG. 13 is a cross-sectional view showing a part of an electromagnetic drive portion of a high-pressure pump according to a ninth embodiment.

FIG. 13 shows a part of a high-pressure pump according to a ninth embodiment. The ninth embodiment is different from the seventh embodiment in the configuration of the "third connection portion" or the like.

In the present embodiment, no seal groove portion 640 is formed in the yoke 641. The "third connection portion" is an adhesive 692. The adhesive 692 is formed of, for example, a resin material having an elastic modulus of a predetermined value or less in an annular plate shape. In the present embodiment, during assembly of the second electromagnetic drive portion 502, before the yoke 641 is brought into contact with the yoke cylinder portion 647 of the yoke 645, a surface of the base portion 652 on a side opposite to the yoke bottom portion 646 is coated with the adhesive 692. Subsequently, the yoke 641 is brought into contact with the yoke cylinder portion 647. At this point, the adhesive 692 is not cured, and the adhesive 692 is brought into close contact with the surface of the base portion 652 on the yoke 641 side and the surface of the yoke 641 on the base portion 652 side.

Subsequently, the yoke 641 and the yoke cylinder portion 647 are welded to form the welded portion 649. Accordingly, the assembly, that is, sub-assembly of the second electromagnetic drive portion 502 is completed. Thereafter, when a predetermined time elapses, the adhesive 692 is cured by moisture. In the present embodiment, the adhesive 692 is formed of a material having elasticity even after being cured.

In the present embodiment, as in the seventh embodiment, the adhesive 692 as the "third connection portion" can prevent the vibration and the wear of the terminal 651 and prevent the poor continuity. In addition, by filling the contact portion between the base portion 652 of the coil sub-assembly 650 and the yoke 641 with the adhesive 692 as the "third connection portion", water can be prevented from entering the contact portion.

In the present embodiment, as in the eighth embodiment, as compared with the seventh embodiment, there is no change in a magnetic material for forming the seal groove portion 640 in the yoke 641 or the like, and thus the influence on an attraction force for the movable core 55 can be reduced.

Tenth Embodiment

Figure 14:
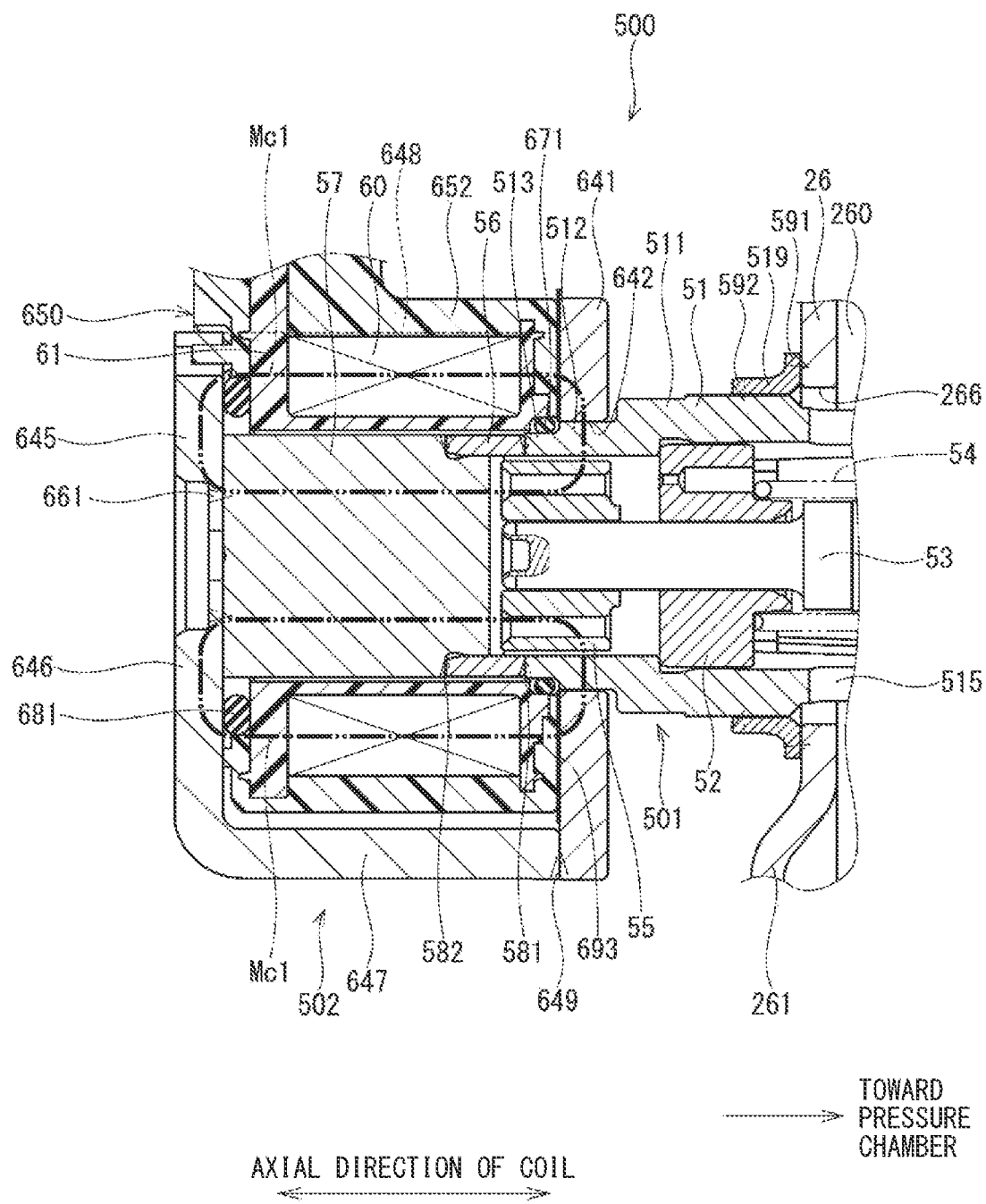
FIG. 14 is a cross-sectional view showing a part of an electromagnetic drive portion of a high-pressure pump according to a tenth embodiment.

FIG. 14 shows a part of a high-pressure pump according to a tenth embodiment. The tenth embodiment is different from the seventh embodiment in the configuration of the "third connection portion" or the like.

In the present embodiment, no seal groove portion 640 is formed in the yoke 641. The "third connection portion" is a rubber plate 693. The rubber plate 693 is formed of an elastic member such as rubber, that is, a resin material having an elastic modulus of a predetermined value or less in an annular plate shape. In the present embodiment, during assembly of the second electromagnetic drive portion 502, before the yoke 641 is brought into contact with the yoke cylinder portion 647 of the yoke 645, the rubber plate 693 is provided on the surface of the base portion 652 on the side opposite to the yoke bottom portion 646. Subsequently, the yoke 641 is brought into contact with the yoke cylinder portion 647. Accordingly, the rubber plate 693 is in close contact with the surface of the base portion 652 on the yoke 641 side and the surface of the yoke 641 on the base portion 652 side.

Subsequently, the yoke 641 and the yoke cylinder portion 647 are welded to form the welded portion 649. Accordingly, the assembly, that is, sub-assembly of the second electromagnetic drive portion 502 is completed.

In the present embodiment, as in the seventh embodiment, the rubber plate 693 as the "third connection portion" can prevent the vibration and the wear of the terminal 651 and prevent the poor continuity. In addition, by filling the contact portion between the base portion 652 of the coil sub-assembly 650 and the yoke 641 with the rubber plate 693 as the "third connection portion", water can be prevented from entering the contact portion.

In the present embodiment, as in the ninth embodiment, as compared with the seventh embodiment, there is no change in a magnetic material for forming the seal groove portion 640 in the yoke 641 or the like, and thus the influence on an attraction force for the movable core 55 can be reduced.

Eleventh Embodiment

Figure 15:
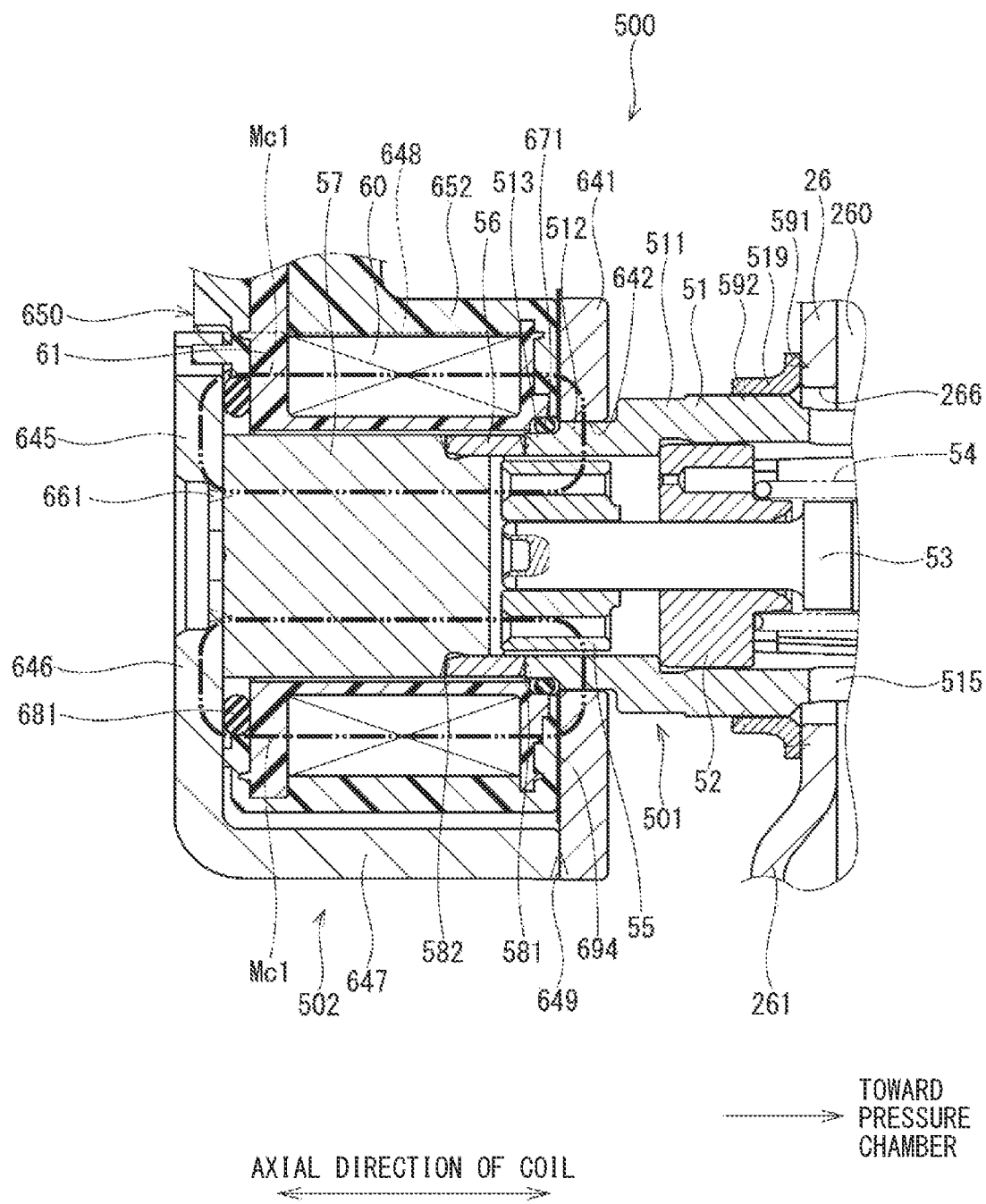
FIG. 15 is a cross-sectional view showing a part of an electromagnetic drive portion of a high-pressure pump according to an eleventh embodiment.

FIG. 15 shows a part of a high-pressure pump according to an eleventh embodiment. The eleventh embodiment is different from the seventh embodiment in the configuration of the "third connection portion" or the like.

In the present embodiment, no seal groove portion 640 is formed in the yoke 641. The "third connection portion" is a gasket 694. The gasket 694 is formed of an elastic member such as a relatively soft metal, that is, a metal material having an elastic modulus of a predetermined value or less in an annular plate shape. In the present embodiment, during assembly of the second electromagnetic drive portion 502, before the yoke 641 is brought into contact with the yoke cylinder portion 647 of the yoke 645, the gasket 694 is provided on the surface of the base portion 652 on the side opposite to the yoke bottom portion 646. Subsequently, the yoke 641 is brought into contact with the yoke cylinder portion 647. Accordingly, the gasket 694 is in close contact with the surface of the base portion 652 on the yoke 641 side and the surface of the yoke 641 on the base portion 652 side.

Subsequently, the yoke 641 and the yoke cylinder portion 647 are welded to form the welded portion 649. Accordingly, the assembly, that is, sub-assembly of the second electromagnetic drive portion 502 is completed.

In the present embodiment, as in the seventh embodiment, the gasket 694 as the "third connection portion" can prevent the vibration and the wear of the terminal 651 and prevent the poor continuity. In addition, by filling the contact portion between the base portion 652 of the coil sub-assembly 650 and the yoke 641 with the gasket 694 as the "third connection portion", water can be prevented from entering the contact portion.

In the present embodiment, as in the ninth embodiment, as compared with the seventh embodiment, there is no change in a magnetic material for forming the seal groove portion 640 in the yoke 641 or the like, and thus the influence on an attraction force for the movable core 55 can be reduced.

Twelfth Embodiment

Figure 16:
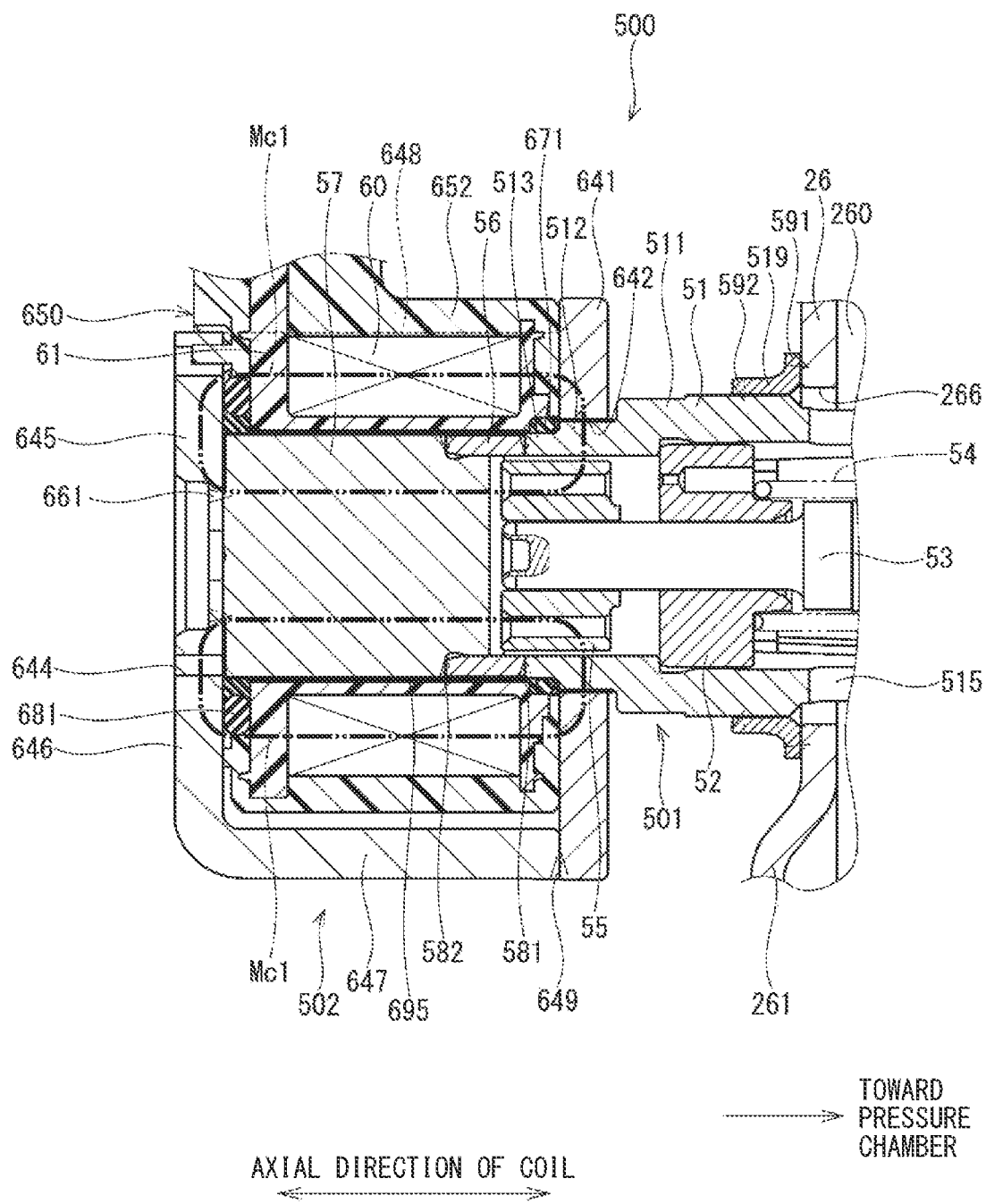
FIG. 16 is a cross-sectional view showing a part of an electromagnetic drive portion of a high-pressure pump according to a twelfth embodiment.

FIG. 16 shows a part of a high-pressure pump according to a twelfth embodiment. The twelfth embodiment is different from the first embodiment in that an "additional connection portion" is further provided.

In the present embodiment, a filler 695 as an "additional connection portion" is further provided. The filler 695 connects the cylinder member 51 and the fixed core 57 to the second electromagnetic drive portion 502 as the "coil assembly".

More specifically, a space between the second cylinder portion 512 and the third cylinder portion 513 of the cylinder member 51, the magnetic throttle portion 56, the fixed core 57, the yoke hole portion 642 of the yoke 641, the base portion 652, the O-ring 671, the spool 61, the O-ring 681, and the yoke bottom portion 646 is filled with the filler 695.

The filler 695 is formed of, for example, an elastic member such as a silicone resin or silicone rubber containing a polymer silicone as a main component, that is, a resin material having an elastic modulus of a predetermined value or less. As described above, the space between the second cylinder portion 512 and the third cylinder portion 513 of the cylinder member 51, the magnetic throttle portion 56, the fixed core 57, the yoke hole portion 642 of the yoke 641, the base portion 652, the O-ring 671, the spool 61, the O-ring 681, and the yoke bottom portion 646 is filled with the filler 695, and thus the members are in close contact with each other. Accordingly, a space between the cylinder member 51 and the fixed core 57 and the second electromagnetic drive portion 502 as the "coil assembly" is kept liquid-tight.

In the present embodiment, the yoke 645 is formed with an injection port 644. The injection port 644 is formed to penetrate the yoke bottom portion 646 in the plate thickness direction. The injection port 644 is formed at a position corresponding to an outer edge portion of the end surface 572 of the fixed core 57 on the side opposite to the pressure chamber 200.

In the present embodiment, by welding the fixed core 57 and the yoke bottom portion 646 to form the welded portion 661, the first electromagnetic drive portion 501 and the second electromagnetic drive portion 502 are assembled, and then the filler 695 in a liquid state is injected from the injection port 644 to fill the space between the second cylinder portion 512 and the third cylinder portion 513 of the cylinder member 51, the magnetic throttle portion 56, the fixed core 57, the yoke hole portion 642 of the yoke 641, the base portion 652, the O-ring 671, the spool 61, the O-ring 681, and the yoke bottom portion 646. When a predetermined time elapses after filling using the filler 695, the filler 695 is cured. In the present embodiment, the filler 695 is formed of a material having elasticity even after being cured.

As described above, in the present embodiment, the filler 695 as the "additional connection portion" is further provided. The filler 695 connects the cylinder member 51 and the fixed core 57 to the second electromagnetic drive portion 502 as the "coil assembly". In addition, in the present embodiment, the filler 695 is formed of an elastic member.

In the present embodiment, the upper housing 21 of the high-pressure pump 10 vibrates due to the vibration of the engine 1, and the electromagnetic drive portion 500 fixed to the upper housing 21 also vibrates. In the present embodiment, the filler 695 is injected from the injection port 644 formed in the yoke 645, and a part of the fixed core 57 and the cylinder member 51 is covered with the filler 695, and thus the first electromagnetic drive portion 501 and the second electromagnetic drive portion 502 are brought into close contact with each other. Therefore, the vibration to be transmitted to the second electromagnetic drive portion 502 as the "coil assembly" can be reduced. Accordingly, the vibration and the wear of the terminal 651 can be reduced, and the poor continuity can be reduced. Therefore, operation malfunction of the intake valve portion 300 can be reduced, and the fuel discharge of the high-pressure pump 10 can be further stabilized.

When a gap is formed between the yoke bottom portion 646 and the fixed core 57 in the welded portion 661 or between the cylinder member 51 and the yoke hole portion 642, the gap may become a path for water to enter the fixed core 57 or the like inside the second electromagnetic drive portion 502 from the outside. In the present embodiment, by filling the space between the second cylinder portion 512 and the third cylinder portion 513 of the cylinder member 51, the magnetic throttle portion 56, the fixed core 57, the yoke hole portion 642 of the yoke 641, the base portion 652, the O-ring 671, the spool 61, the O-ring 681, and the yoke bottom portion 646 with the filler 695, water can be prevented from entering the space, and the corrosion resistance of the fixed core 57 or the like can be further improved.

Thirteenth Embodiment

Figure 17:
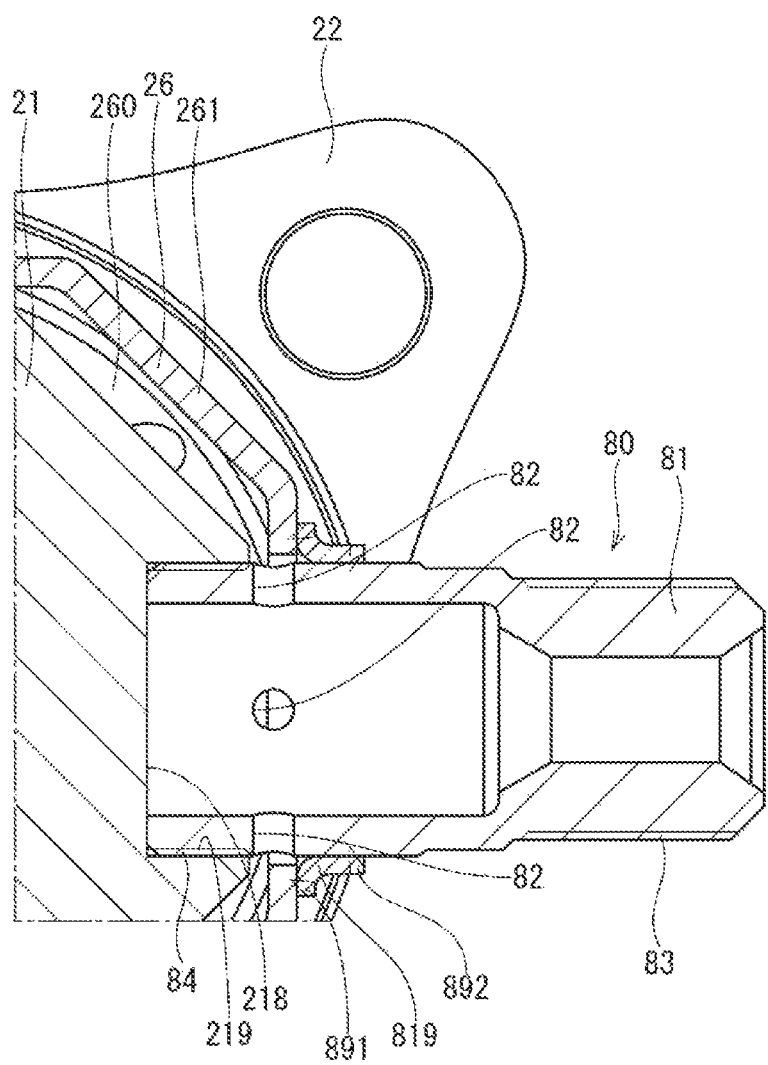
FIG. 17 is a cross-sectional view showing a part of a high-pressure pump according to a thirteenth embodiment.

FIG. 17 shows a part of a high-pressure pump according to a thirteenth embodiment. The thirteenth embodiment is different from the first embodiment in the configuration of the supply passage portion or the like.

In the present embodiment, a supply passage portion 80 is provided. The supply passage portion 80 includes a passage portion body 81, supply holes 82, a thread portion 83, and a thread portion 84. The passage portion body 81 is formed of a metal such as stainless steel in a cylindrical shape having a relatively large thickness. The supply holes 82 are each formed in a circular shape so as to allow communication between the inside and the outside of the passage portion body 81. Four supply holes 82 are formed at equal intervals in a circumferential direction of the passage portion body 81. The thread portion 83 is formed as a thread on an outer peripheral wall of the passage portion body 81 at one end. The thread portion 84 is formed as a thread on an outer peripheral wall of the passage portion body 81 at the other end.

The cover 26 is provided with a cover hole portion 265. The cover hole portion 265 is formed in a circular shape so as to allow communication between the outside and the inside of the cover cylinder portion 261. The upper housing 21 is formed with a housing hole portion 218. The housing hole portion 218 is formed at a position corresponding to the cover hole portion 265 so as to be recessed in a circular shape from the outer peripheral wall of the upper housing 21. The housing hole portion 218 is formed with a housing-side thread portion 219. The housing-side thread portion 219 is formed as a thread groove in an inner peripheral wall of the housing hole portion 218.

The supply passage portion 80 is provided in the upper housing 21 such that the passage portion body 81 is inserted into the cover hole portion 265 and the thread portion 84 is screw-coupled to the housing-side thread portion 219.

A welding ring 819 is provided on a radially outer side of the passage portion body 81 outside the cover 26. The welding ring 819 is formed of, for example, a metal in a substantially cylindrical shape. The welding ring 819 is provided such that an end portion thereof on a cover 26 side expands to the radially outer side, and is in contact with the periphery of the cover hole portion 265 of the cover outer peripheral wall. The end portion of the welding ring 819 on the cover 26 side is welded to the cover outer peripheral wall over the entire range in the circumferential direction, and a portion of the welding ring 819 on a side opposite to the cover 26 is welded to the outer peripheral wall of the passage portion body 81 over the entire range in the circumferential direction. More specifically, at the end portion of the welding ring 819 on the cover 26 side, a welded portion 891, which is formed by melting the welding ring 819 and the cover 26 through welding, followed by cooling and solidification, connects the welding ring 819 and the cover 26 over the entire range in the circumferential direction. In addition, at an end portion of the welding ring 819 on the side opposite to the cover 26, a welded portion 892, which is formed by melting the welding ring 819 and the passage portion body 81 through welding, followed by cooling and solidification, connects the welding ring 819 and the passage portion body 81 over the entire range in the circumferential direction. Accordingly, the fuel in the fuel chamber 260 is prevented from leaking to the outside of the cover 26 through a gap between the cover hole portion 265 and the outer peripheral wall of the passage portion body 81.

A fuel supply pipe (not shown) is connected to the supply passage portion 80. The fuel supply pipe is, for example, a steel pipe, and is formed with a thread groove in an inner peripheral wall of an end portion on a side opposite to the fuel pump. The thread groove at the end portion of the fuel supply pipe is screw-coupled to the thread portion 83 of the passage portion body 81. Here, a tightening torque when the thread portion 84 of the passage portion body 81 is screw-coupled to the housing-side thread portion 219 is set to be larger than a tightening torque when the fuel supply pipe is screw-coupled to the thread portion 83.

Next, a high-pressure pump according to a comparative embodiment will be described.

Figure 18:
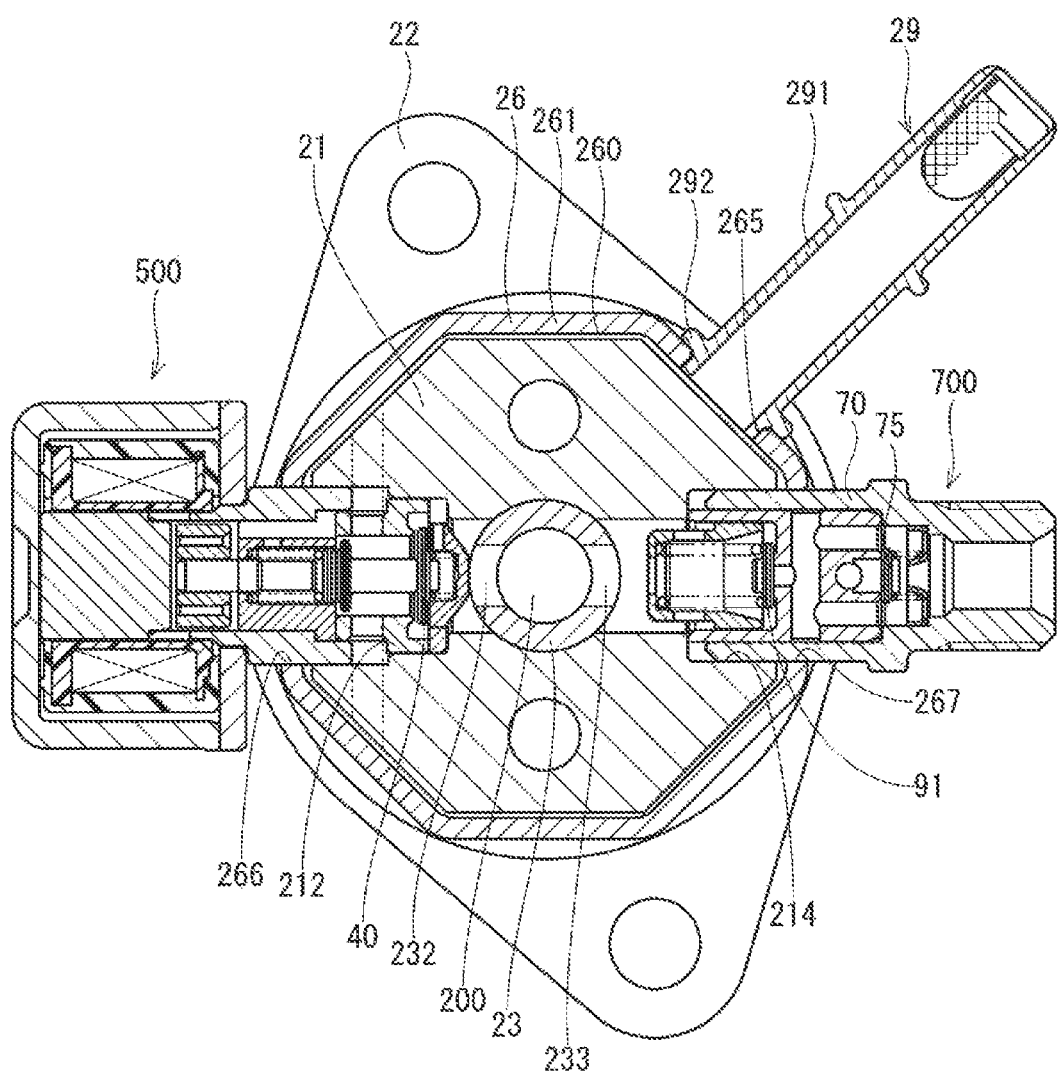
FIG. 18 is a cross-sectional view showing a high-pressure pump according to a comparative embodiment.

As shown in FIG. 18, according to the comparative embodiment, a supply passage portion 29 is provided. The supply passage portion 29 includes a passage portion body 291 and an annular protrusion portion 292. The passage portion body 291 is formed of a metal such as stainless steel in a cylindrical shape having a relatively small thickness. Here, the thickness of the passage portion body 291 is smaller than the thickness of the passage portion body 81 according to the present embodiment.

The annular protrusion portion 292 is formed to protrude in an annular shape from an outer peripheral wall of the passage portion body 291 at an end portion. The supply passage portion 29 is provided on the cover 26 by inserting the end portion of the passage portion body 291 into the cover hole portion 265 and welding the annular protrusion portion 292 to the outer peripheral wall of the cover cylinder portion 261.

A fuel supply pipe (not shown) is connected to the supply passage portion 29. The fuel supply pipe is, for example, a relatively soft pipe formed of a resin.

The comparative embodiment has a configuration same as that of a high-pressure pump disclosed in JP-A-2012-215164. In the comparative embodiment, when a stress is applied to a welded portion between the supply passage portion 29 and the cover 26 due to pipe pulsation, a pipe external force, vibration of the engine 1, vibration of components during operation, and the like, the welded portion may be damaged. When the welded portion is damaged, the fuel in the fuel chamber 260 may leak to the outside.

An object of the present embodiment is to provide a high-pressure pump capable of preventing damage to a welded portion of a member and preventing leakage of fuel.

In the present embodiment, the supply passage portion 80 is screw-coupled to the upper housing 21 and the supply passage portion 80 and the cover 26 are welded to each other. Therefore, even when the pipe pulsation, the pipe external force, the vibration of the engine 1, the vibration components during operation, and the like occur, a stress applied to the welded portion 891 and the welded portion 892 can be reduced. Accordingly, the fuel in the fuel chamber 260 can be prevented from leaking to the outside through the welded portion 891 and the welded portion 892.

By providing the thread portion 83 in the supply passage portion 80, the supply passage portion 80 can be connected to a fuel supply pipe formed of a steel pipe having a thread portion, and a risk of fuel leakage can be reduced.

The fuel that has flowed into the supply passage portion 80 from a fuel supply pipe side flows into the fuel chamber 260, which is a wide space, through the supply hole 82 in an orifice shape. Therefore, the supply hole 82 serves as an aperture, and low-pressure pulsation on the fuel supply pipe side can be damped.

A tightening torque when the thread portion 84 of the passage portion body 81 is screw-coupled to the housing-side thread portion 219 is set to be larger than a tightening torque when the fuel supply pipe is screw-coupled to the thread portion 83. Accordingly, the stress applied to the welded portion 891 and the welded portion 892 when the fuel supply pipe is screw-coupled to the thread portion 83 can be relaxed.

Fourteenth Embodiment

Figure 19:
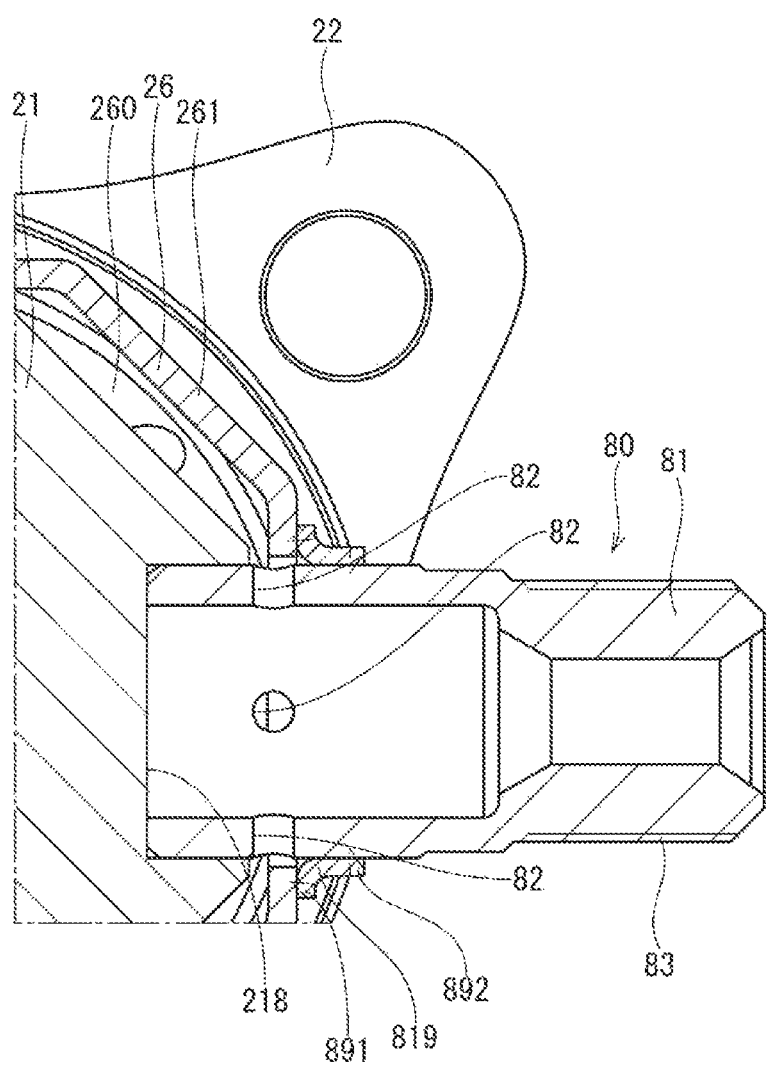
FIG. 19 is a cross-sectional view showing a part of a high-pressure pump according to a fourteenth embodiment.

FIG. 19 shows a part of a high-pressure pump according to a fourteenth embodiment. The fourteenth embodiment is different from the thirteenth embodiment in the configuration of the supply passage portion or the like.

In the present embodiment, the supply passage portion 80 is not provided with the thread portion 84. In addition, the upper housing 21 is not provided with the housing-side thread portion 219. The supply passage portion 80 is provided in the upper housing 21 such that the passage portion body 81 is inserted into the cover hole portion 265 and the end portion of the passage portion body 291 is press-fitted into the housing hole portion 218.

The present embodiment has a configuration same as that in the thirteenth embodiment except for the above points.

Other Embodiments

In the above embodiments, the example is shown in which the yoke 641 as the "first yoke" is provided on the pressure chamber 200 side with respect to the coil 60 in the axial direction of the coil 60. On the other hand, in other embodiments, the yoke 641 may not be provided on the pressure chamber 200 side with respect to the coil 60 as long as a magnetic circuit can be formed on the pressure chamber 200 side with respect to the coil 60 in the axial direction of the coil 60.

In the first to third and sixth embodiments, the example is shown in which the "second connection portion" is formed of an elastic member in an annular shape. On the other hand, in other embodiments, the "second connection portion" may be formed of a material having an elastic modulus larger than a predetermined value. In addition, the "second connection portion" is not limited to having an annular shape, and may be formed in a shape in which a part in a circumferential direction is interrupted.

In the above embodiments, the example is shown in which the intake valve portion and the electromagnetic drive portion form the normally open type valve device. On the other hand, in other embodiments, an intake valve portion and an electromagnetic drive portion may form a normally closed type valve device.

In other embodiments, the cover 26 may not be provided. In this case, for example, a supply passage portion may be provided in the upper housing 21 such that the inside of the supply passage portion and the intake passage 216 communicate with each other.

In other embodiments, at least two of the cylinder 23, the upper housing 21, and the lower housing 22 may be provided integrally. In addition, in other embodiments, at least two of the upper housing 21, the seat member 31, and the stopper 35 may be provided integrally.

In other embodiments, the above embodiments may be appropriately combined as long as there is no obstructive factor on the configuration. For example, the seventh embodiment and the twelfth embodiment are combined.

In the above embodiments, the example is shown in which the "third connection portion" and the "additional connection portion" are formed of an elastic member. On the other hand, in other embodiments, the "third connection portion" and the "additional connection portion" may be formed of a material having an elastic modulus larger than a predetermined value.

In other embodiments, a high-pressure pump may be applicable to an internal combustion engine other than a gasoline engine, such as a diesel engine. In addition, the high-pressure pump may be used as a fuel pump that discharges fuel toward a device other than an engine of a vehicle.

As described above, the present disclosure is not limited to the above-described embodiments, and can be implemented in a variety of embodiments without departing from the scope of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A high-pressure pump comprising:
 a pressure chamber forming portion having a pressure chamber in which fuel is pressurized;
 an intake passage forming portion having an intake passage through which the fuel flows to be sucked into the pressure chamber;
 a seat member arranged in the intake passage and including a communication passage through which one surface and another surface of the seat member communicate with each other;
 a valve member provided between the seat member and the pressure chamber, and configured to allow or block a flow of the fuel through the communication passage by the valve member being separated from the seat member in a valve open state or being in contact with the seat member in a valve closed state;
 a cylinder member arranged such that the seat member is between the cylinder member and the pressure chamber;
 a needle reciprocable in an axial direction of the cylinder member inside the cylinder member, the needle having one end movable together with the valve member;
 a movable core provided at another end of the needle;
 a fixed core facing the movable core in an axial direction of the needle;
 a coil assembly including
  a coil sub-assembly that includes a connector, a terminal provided in the connector, a coil having a cylindrical shape and connected to the terminal, and a resin portion covering the terminal and the coil,
  a first yoke arranged between the coil and the pressure chamber in an axial direction of the coil, the first yoke being configured to form a magnetic circuit by energization of the coil, and a second yoke arranged such that the coil is between the second yoke and the pressure chamber in the axial direction of the coil, the second yoke being configured to form a magnetic circuit by energization of the coil;

a first connection portion arranged such that the coil assembly is between the first connection portion and the pressure chamber, the first connection portion connecting the coil assembly and the fixed core; and a second connection portion arranged between the coil assembly and the pressure chamber, the second connection portion connecting the coil assembly and the cylinder member, wherein the second connection portion is formed of an elastic member and has an annular shape, and the second connection portion is elastically deformable in the axial direction of the cylinder member between the first yoke and the cylinder member.

2. The high-pressure pump according to claim 1, wherein the first yoke has an annular shape, the cylinder member has a step surface that is annular, and the second connection portion is provided between a radially inner portion of the first yoke and the step surface.

3. The high-pressure pump according to claim 1, further comprising a third connection portion connecting the first yoke and the resin portion.

4. The high-pressure pump according to claim 3, wherein the third connection portion is formed of an elastic member.

5. The high-pressure pump according to claim 1, further comprising an additional connection portion connecting the cylinder member and the coil assembly and connecting the fixed core and the coil assembly.

6. The high-pressure pump according to claim 5, wherein the additional connection portion is formed of an elastic member.

* * * * *